United States Patent
Dorogusker et al.

(10) Patent No.: US 8,458,184 B2
(45) Date of Patent: Jun. 4, 2013

(54) TAGGING MEDIA ASSETS, LOCATIONS, AND ADVERTISEMENTS

(75) Inventors: Jesse Lee Dorogusker, Los Altos, CA (US); Emily Clark Schubert, San Jose, CA (US); Michael Benjamin Hailey, Campbell, CA (US); Steve Saro Gedikian, San Francisco, CA (US); Gregory Thomas Lydon, Santa Cruz, CA (US); Lawrence G. Bolton, Fremont, CA (US)

(73) Assignee: Apple Inc., Cupertino, CA (US)

( * ) Notice: Subject to any disclaimer, the term of this patent is extended or adjusted under 35 U.S.C. 154(b) by 508 days.

(21) Appl. No.: 11/961,127

(22) Filed: Dec. 20, 2007

(65) Prior Publication Data

US 2008/0183757 A1 Jul. 31, 2008

Related U.S. Application Data

(60) Provisional application No. 60/957,648, filed on Aug. 23, 2007, provisional application No. 60/916,766, filed on May 8, 2007, provisional application No. 60/923,439, filed on Apr. 12, 2007, provisional application No. 60/876,857, filed on Dec. 22, 2006.

(51) Int. Cl.
  *G06F 7/04* (2006.01)
  *G06F 17/30* (2006.01)
(52) U.S. Cl.
  USPC .............................. 707/740; 707/741; 707/756
(58) Field of Classification Search
  USPC .................... 707/104.1, 100, 999.104, 999.1, 707/741, 740, 102, 999.102, 999.107, 755; 340/12.51; 455/414.2, 414.3, 3.04; 348/211.2, 348/211.3
  See application file for complete search history.

(56) References Cited

U.S. PATENT DOCUMENTS

| | | | |
|---|---|---|---|
| 4,977,455 | A | 12/1990 | Young |
| 5,303,393 | A | 4/1994 | Noreen et al. |
| 6,230,205 | B1 | 5/2001 | Garrity et al. |
| 6,342,926 | B1 | 1/2002 | Hanafee et al. |

(Continued)

FOREIGN PATENT DOCUMENTS

| | | |
|---|---|---|
| EP | 1 220 479 A | 7/2002 |
| EP | 1367734 A1 | 12/2003 |

(Continued)

OTHER PUBLICATIONS

Search/Examination report for Great Britain Patent Application GB0909613.2, issued Feb. 18, 2010, 4 pages.*

(Continued)

*Primary Examiner* — Bruce Moser
(74) *Attorney, Agent, or Firm* — Kilpatrick Townsend & Stockton

(57) ABSTRACT

An accessory communicates with a PMD to store tags associated with broadcasts in a file maintained in a storage medium of the accessory. In one embodiment, the accessory sends a command to the PMD to create or open a tag file that resides on the PMD. Once opened, the tag file is held open by the PMD until the accessory closes it (or disconnects), allowing multiple tags to be written to one file. Each time the user requests a new tag, the accessory generates a tag containing information descriptive of the broadcast material (e.g., song title, artist, radio station identifier, time of tagging, etc.) and writes the tag to the tag file using a write command to the PMD.

36 Claims, 15 Drawing Sheets

U.S. PATENT DOCUMENTS

| | | | |
|---|---|---|---|
| 6,463,469 | B1 | 10/2002 | Yavitz |
| 6,473,792 | B1 | 10/2002 | Yavitz et al. |
| 6,505,160 | B1 | 1/2003 | Levy et al. |
| 6,578,047 | B1 | 6/2003 | Deguchi |
| 6,604,072 | B2 | 8/2003 | Pitman et al. |
| 6,650,877 | B1 | 11/2003 | Tarbouriech et al. |
| 6,674,993 | B1 | 1/2004 | Tarbouriech |
| 6,701,060 | B2 | 3/2004 | Yuen et al. |
| 6,748,360 | B2 | 6/2004 | Pitman et al. |
| 6,941,275 | B1 | 9/2005 | Swierczek |
| 6,972,698 | B2 | 12/2005 | Deguchi |
| 6,990,453 | B2 | 1/2006 | Wang et al. |
| 7,062,528 | B2 | 6/2006 | Deguchi |
| 7,124,125 | B2 | 10/2006 | Cook et al. |
| 7,127,154 | B2 | 10/2006 | Son et al. |
| 7,158,753 | B2 | 1/2007 | Kagan et al. |
| 7,187,947 | B1 | 3/2007 | White et al. |
| 7,283,973 | B1 | 10/2007 | Loghmani et al. |
| 7,343,141 | B2 | 3/2008 | Ellis et al. |
| 7,613,380 | B2 | 11/2009 | Yanagita |
| 7,634,605 | B2 | 12/2009 | Laeter et al. |
| 2002/0010759 | A1 | 1/2002 | Hitson et al. |
| 2002/0012525 | A1 | 1/2002 | Yuen et al. |
| 2002/0102954 | A1 | 8/2002 | Kaneko |
| 2002/0132575 | A1 | 9/2002 | Kesling et al. |
| 2002/0151327 | A1 | 10/2002 | Levitt |
| 2002/0152874 | A1 | 10/2002 | Vilcauskas et al. |
| 2002/0183059 | A1 | 12/2002 | Noreen et al. |
| 2002/0194264 | A1 | 12/2002 | Uchiyama et al. |
| 2003/0040272 | A1 | 2/2003 | Lelievre et al. |
| 2003/0151621 | A1 | 8/2003 | McEvilly et al. |
| 2004/0019497 | A1 | 1/2004 | Volk et al. |
| 2004/0073561 | A1 | 4/2004 | Torres et al. |
| 2004/0073727 | A1 | 4/2004 | Moran et al. |
| 2004/0088180 | A1 | 5/2004 | Akins, III |
| 2004/0127199 | A1 | 7/2004 | Kagan et al. |
| 2004/0186857 | A1 | 9/2004 | Serlet et al. |
| 2004/0198331 | A1* | 10/2004 | Coward et al. ............. 455/414.1 |
| 2004/0199432 | A1 | 10/2004 | Iwase et al. |
| 2004/0218902 | A1* | 11/2004 | Yanagita ........................ 386/52 |
| 2004/0266336 | A1 | 12/2004 | Patsiokas et al. |
| 2005/0020223 | A1 | 1/2005 | Ellis et al. |
| 2005/0168588 | A1* | 8/2005 | Fisher et al. ............... 348/211.2 |
| 2005/0275726 | A1* | 12/2005 | Abraham et al. ........ 348/207.99 |
| 2006/0069749 | A1 | 3/2006 | Herz et al. |
| 2006/0184538 | A1 | 8/2006 | Randall et al. |
| 2006/0184960 | A1 | 8/2006 | Horton et al. |
| 2006/0187317 | A1 | 8/2006 | Montulli et al. |
| 2006/0206582 | A1 | 9/2006 | Finn |
| 2006/0235864 | A1 | 10/2006 | Hotelling et al. |
| 2007/0028006 | A1 | 2/2007 | Laefer et al. |
| 2007/0281689 | A1* | 12/2007 | Altman et al. ............. 455/435.1 |
| 2008/0082523 | A1* | 4/2008 | Momosaki et al. ............... 707/5 |
| 2008/0126191 | A1 | 5/2008 | Schiavi |
| 2008/0162358 | A1 | 7/2008 | Patsiokas et al. |
| 2008/0183757 | A1 | 7/2008 | Dorogusker et al. |
| 2008/0188209 | A1 | 8/2008 | Dorogusker et al. |
| 2009/0034450 | A1 | 2/2009 | Umer |
| 2009/0063975 | A1 | 3/2009 | Bull et al. |
| 2009/0070370 | A1 | 3/2009 | Cunningham et al. |
| 2009/0100068 | A1 | 4/2009 | Gauba et al. |
| 2009/0125609 | A1 | 5/2009 | Wood et al. |
| 2009/0158155 | A1 | 6/2009 | Quinn et al. |
| 2009/0326949 | A1 | 12/2009 | Douthitt et al. |
| 2010/0121741 | A1 | 5/2010 | Hotelling et al. |
| 2010/0131567 | A1 | 5/2010 | Dorogusker et al. |
| 2011/0053491 | A1 | 3/2011 | Bolton et al. |

FOREIGN PATENT DOCUMENTS

| | | |
|---|---|---|
| EP | 1650971 A1 | 4/2006 |
| WO | WO 95/01058 A1 | 1/1995 |
| WO | WO 2005/024818 A1 | 3/2005 |
| WO | WO 2007/144030 A1 | 12/2007 |
| WO | WO 2008074968 A1 | 6/2008 |
| WO | WO 2008/080006 A2 | 7/2008 |

OTHER PUBLICATIONS

AT&T Wireless: mMode phones and how to access your music and ringtones [online], [retrieved on Oct. 10, 2005]. Retrived from the Internet <URL:http://www.attwireless.com/personal/features/fun/musichowto.jhtml>, pp. 1-3.

Brodia, "How to Do Everything With Your Zune," 1st Ed., Jul. 2007, pp. 71-73.

Griffin 4020TALK—iTalk Voice Recorder for iPod, product description, Electronic Express [online], [retrieved on Jun. 18, 2006]. Retrieved from the Internet <URL:http://www.electronicexpress.com/product?prod_id=7464>.

Griffin—radio SHARK, product information sheet, Griffin Technology, [online], [retrieved Jun. 18, 2006]. Retrieved from the Internet <URL: http://www.griffintechnology.com/products/radioshark>.

MacXM Features [online], [retrieved on Apr. 11, 2005]. Retrieved from the Internet <URL:http://macxm.sourceforge.net/features.html>, 1 page.

MacXM Screenshots [online], [retrieved on Apr. 11, 2005]. Retrieved from the Internet <URL:http://macxm.sourceforge.net/shots.html> pp. 1-2.

MacXM FAQs [online], [retrieved on Apr. 11, 2005]. Retrieved from the Internet <URL:http://macxm.sourceforge.net/faq.html>, pp. 1-6.

Menta et al., "Review: Neuros MP3 Digital Audio Computer," [online], [retrieved on May 4, 2005]. Retrieved from the Internet <URL: http://www.mp3newswire.net/stories/2003/neuros.html>.

Microsoft Zune—Ars Technica, By Nate Anderson, last updated Nov. 15, 2006, [online], six parts, 18 pages [retrieved on Mar. 23, 2009]. Retrieved from the Internet <URL:http://arstechnica.com/hardware/reviews/2006/11/zune.ars>.

Miller et al, "Audio Fingerprinting: Nearest Neighbor Search in High Dimensional Binary Spaces," IEEE Multimedia Signal Processing Workshop 2002, St. Thomas, U.S. Virgin Islands, pp. 1-4.

Neuros MP3 Digital Audio Computer [online], [retrieved Nov. 8, 2004]. Retrieved from the Internet <URL:http://www.neurosaudio.com>, pp. 1-2.

Neuros User's Guide, 2nd Edition, Neuros Audio, LLC.,Chicago, IL, pp. 1-25.

Philips Research, "Content Identification Audio Fingerprinting Technology," [online], [retrieved on Sep. 29, 2004]. Retrieved from the Internet <URL:http://www.research.philips.com/initiatives/contentid/audiofp.html>, 5 pages.

RepliCheck How It Works, Audible Magic Corporation [online], [retrieved on Sep. 29, 2004]. Retrieved on the Internet <URL:http://www.replicheck.com/how_it_works.html>, pp. 1-4.

Schwarz, SchwarzTech Review: Griffin iTalk [online], [retreived on Jun. 18, 2006]. Retrieved from the Internet <URL:http://schwarztech.us/reviews/italk.shtml>.

Shazam Technology, Shazam Entertainment Ltd. [online], [retrieved Sep. 29, 2004]. Retrieved from the Internet <URL:http://www.shazamentertainment.com/technology.shtml>, 2 pages.

Shazam Mobile Products & Services, Shazam Entertainment Ltd. [online], [retrieved Sep. 29, 2004]. Retrieved from the Internet <URL:http://www.shazamentertainment.com/products.shtml>, 2 pages.

Sony device bookmarks music heard on radio—CNET News, by Ian Fried, dated Jun. 9, 2000, [online], [retrieved Mar. 19, 2009]. Retrieved from the Internet <URL:http://news.cnet.com/2100-1040-241675.html>.

UBC Media Group—Radio Stations News, dated Dec. 13, 2007, [online], [retrieved on Mar. 19, 2009]. Retrieved on the Internet URL:http://www.ubcmedia.com/pressview.php?ID=157>.

UBC Media Group—Group News, dated Jun. 25, 2007, [online], [retrieved on Mar. 19, 2009]. Retrieved on the Internet <URL:http://www.ubcmedia.com/pressview.php?ID=110>.

International Search Report PCT/US2007/088453 dated Dec. 12, 2008.

International Search Report mailed on Sep. 22, 2008, for PCT Application No. PCT/US2007/088425 filed on Dec. 20, 2007, 5 pages.

Partial International Search Report mailed on Oct. 6, 2008, for PCT Application No. PCT/US2007/088453 filed on Dec. 20, 2007, 4 pages.

Examiner's First Report dated May 31, 2010 for Australian Patent Application No. 2007336816, 2 pages.
First Office Action dated May 27, 2010 for Chinese Patent Application No. 200780047063.0, 21 pages.
Examination Report under Section 18(3) dated Jul. 1, 2010 for Great Britain Application No. GB0911578.3, 3 pages.
Non-Final Office Action, Mail date Jan. 4, 2011; U.S. Appl. No. 12/693,943, 9 pages.
Front page of Chicago Bulls website, http://nba.com/bulls/, as of Nov. 8, 2006 captured through Wayback Machine on Dec. 16, 2010; http://web.archive.org/web/20061108221003/http://www.nba.com/bulls, 1 page.
First Office Action dated Jan. 18, 2011 for Chinese Patent Application No., (In Chinese Only), 4 pages.
Office Action and Search Report dated May 11, 2011 for Taiwan Intellectual Property Office (IPO), TW Application No. 096149601, (In Chinese Only), 5 pages.
European Patent Office, Examination Report dated Jun. 20, 2011 for EPO Application No. 07 869 685.3, 4 pages.
Non-Final Office Action of Jul. 21, 2011 for U.S. Appl. No. 11/961,904, 30 pages.
Restriction Requirement of Jun. 8, 2011 for U.S. Appl. No. 11/961,904, 11 pages.
European Search Report for European Application No. 09 164 888.1, mailed on Feb. 10, 2012, 6 pages.

* cited by examiner

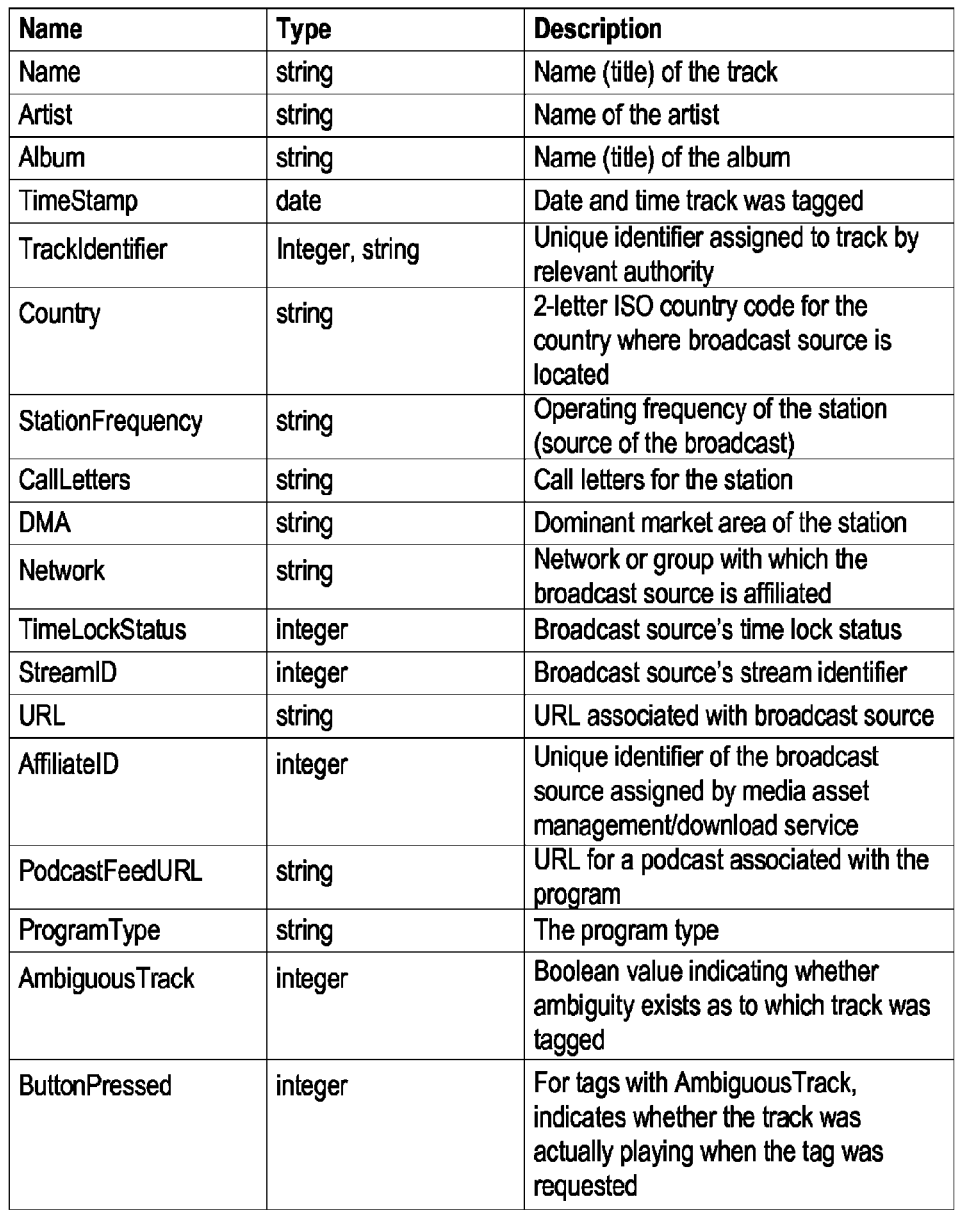

| Name | Type | Description |
| --- | --- | --- |
| Name | string | Name (title) of the track |
| Artist | string | Name of the artist |
| Album | string | Name (title) of the album |
| TimeStamp | date | Date and time track was tagged |
| TrackIdentifier | Integer, string | Unique identifier assigned to track by relevant authority |
| Country | string | 2-letter ISO country code for the country where broadcast source is located |
| StationFrequency | string | Operating frequency of the station (source of the broadcast) |
| CallLetters | string | Call letters for the station |
| DMA | string | Dominant market area of the station |
| Network | string | Network or group with which the broadcast source is affiliated |
| TimeLockStatus | integer | Broadcast source's time lock status |
| StreamID | integer | Broadcast source's stream identifier |
| URL | string | URL associated with broadcast source |
| AffiliateID | integer | Unique identifier of the broadcast source assigned by media asset management/download service |
| PodcastFeedURL | string | URL for a podcast associated with the program |
| ProgramType | string | The program type |
| AmbiguousTrack | integer | Boolean value indicating whether ambiguity exists as to which track was tagged |
| ButtonPressed | integer | For tags with AmbiguousTrack, indicates whether the track was actually playing when the tag was requested |

FIG. 2

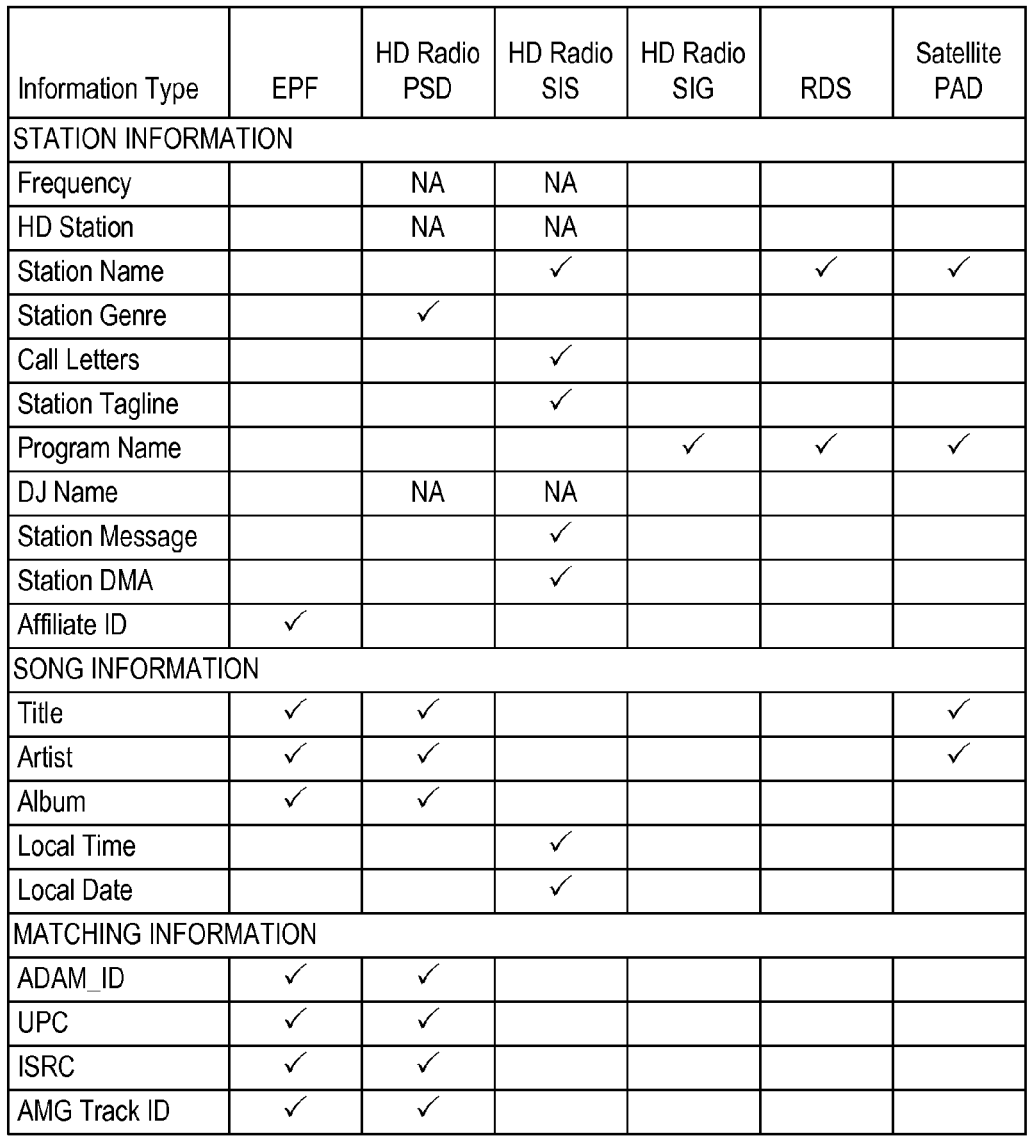

| Information Type | EPF | HD Radio PSD | HD Radio SIS | HD Radio SIG | RDS | Satellite PAD |
|---|---|---|---|---|---|---|
| STATION INFORMATION | | | | | | |
| Frequency | | NA | NA | | | |
| HD Station | | NA | NA | | | |
| Station Name | | | ✓ | | ✓ | ✓ |
| Station Genre | | ✓ | | | | |
| Call Letters | | | ✓ | | | |
| Station Tagline | | | ✓ | | | |
| Program Name | | | | ✓ | ✓ | ✓ |
| DJ Name | | NA | NA | | | |
| Station Message | | | ✓ | | | |
| Station DMA | | | ✓ | | | |
| Affiliate ID | ✓ | | | | | |
| SONG INFORMATION | | | | | | |
| Title | | ✓ | ✓ | | | ✓ |
| Artist | | ✓ | ✓ | | | ✓ |
| Album | | ✓ | ✓ | | | |
| Local Time | | | | ✓ | | |
| Local Date | | | | ✓ | | |
| MATCHING INFORMATION | | | | | | |
| ADAM_ID | | ✓ | ✓ | | | |
| UPC | | ✓ | ✓ | | | |
| ISRC | | ✓ | ✓ | | | |
| AMG Track ID | | ✓ | ✓ | | | |

FIG. 3

```
<!DOCTYPE plist PUBLIC "MFR//DTD PLIST 1.0//EN"
"http://www.apple.com/DTDs/PropertyList-1.0.dtd">
<plist version="1.0">
<dict>
        <key>MajorVersion</key>
        <integer>1</integer>
        <key>MinorVersion</key>
        <integer>1</integer>
        <key>ManufacturerID</key>
        <integer>17</integer>
410     <key>ManufacturerName</key>
        <string>Acme</string>
        <key>DeviceName</key>
        <string>AC-HDR100</string>
        <key>iTunesAffiliateID</key>
        <integer>0</integer>
        <key>MarkedTracks</key>
        <array>
                <dict>
                        <key>AMGTrackID</key>
                        <integer>0</integer>
                        <key>Album</key>
                        <string>One by One</string>
                        <key>Artist</key>
                        <string>Foo Fighters</string>
                        <key>Country</key>
                        <string>US</string>
                        <key>GRid</key>
                        <string>A1-2425G-ABC1234002-M</string>
                        <key>Name</key>
                        <string>Times Like These</string>
                        <key>ProgramType</key>
                        <string>Music</string>
420                     <key>StationCallLetters</key>
                        <string>KFOG</string>
                        <key>StationDMA</key>
                        <string>San Francisco, CA</string>
                        <key>StationGroup</key>
                        <string></string>
                        <key>StationURL</key>
                        <string>http://www.kfog.com</string>
                        <key>TimeStamp</key>
                        <date>2007-04-16T00:35:42Z</date>
                        <key>iTunesArtistID</key>
                        <string>6906197</string>
                        <key>iTunesPlaylistID</key>
                        <integer>6906317</integer>
                        <key>iTunesSongID</key>
                        <integer>6906304</integer>
                </dict>
                <dict>
                        . . .
430             </dict>
        </array>
</dict>
</plist>
```

FIG. 4C

TAGGING MEDIA ASSETS, LOCATIONS, AND ADVERTISEMENTS

CROSS-REFERENCES TO RELATED APPLICATIONS

The application claims priority to and the benefit of each of the following four commonly assigned U.S. Patent Applications: U.S. Patent Application No. 60/876,857, filed Dec. 22, 2006; U.S. Patent Application No. 60/923,439, filed Apr. 12, 2007; U.S. Patent Application No. 60/916,766, filed May 8, 2007; U.S. Patent Application No. 60/957,648, filed Aug. 23, 2007, the entire disclosures of which are incorporated herein by reference for all purposes.

This application is related to commonly assigned co-pending U.S. patent application Ser. No. 11/961,904, filed Dec. 20, 2007 entitled "Communicating and Storing Information Associated with Media Broadcasts," and to U.S. patent application Ser. No. 11/210,172, filed Aug. 22, 2005 and entitled "Audio sampling and acquisition system," the entire disclosures of which are incorporated by reference for all purposes.

FIELD OF THE INVENTION

The present invention relates generally to receiving broadcasts and in particular to systems and methods for communicating and storing information associated with data within a broadcast.

BACKGROUND OF THE INVENTION

Users listen to, watch or otherwise receive broadcasts in a variety of contexts. For example, it is common to listen to the radio broadcast while driving, riding public transit, exercising, hiking, doing chores, or the like. Additionally, users now are more often using Global Positioning and other broadcast-based location services for navigation and recreation.

In the case of radio, the user may hear a song he or she likes but might not hear or be able to remember the title of the song or the name of the artist. Or a user might see a portion of a television ("TV") broadcast that seems interesting but not catch the name of the program, or the store that sells a product in an advertisement. Or the user might be driving using an navigation system, and see a restaurant or store that looks interesting on route to another destination.

Often, even when identifying information is provided, the user might not have ready access to a pen or paper to write down the information (e.g., when driving) and might not be able to remember it later. This can make it difficult for users who want to acquire interesting content to locate the content later.

Accordingly, what is desired are improved methods and apparatus for solving the problems discussed above. Additionally, what is desired are improved methods and apparatus for reducing some of the drawbacks discussed above. Thus, it would therefore be desirable to provide improved techniques to facilitate communication and storing of information about broadcasts.

BRIEF SUMMARY OF THE INVENTION

In accordance with some embodiments of the present invention, a portable media device and/or an accessory coupled thereto can be used to collect and store information about broadcasts received by the portable media device and/or accessory. The collected information, referred to herein as a "tag," can encompass any type of data that facilitates identification of a particular broadcast (e.g., a song in the case of music broadcasts, a podcast, an episode of a TV program, a location associated with a GPS signal, a store/product/good/service associated with an advertisement, and the like).

In some embodiments, the portable media device can be coupled to an accessory that is capable of receiving broadcasts. The broadcast can include broadcast content as well as metadata identifying the content (e.g., track title, location, store/product) and/or the broadcaster. The accessory can capture the metadata (and/or a portion of the broadcast content itself) and provide the metadata (and/or content) as a tag to the portable media device, either in response to a user command or automatically.

The portable media device may accept input indicative of a user's desire to tag data associated with a broadcast. In response to the input, the media device may use the data to generate a tag. The tag may be stored either locally in the media device and/or uploaded to another device (such as, e.g., an accessory, a central server, personal computer, etc.). The tag may include various amounts of identifying information about the broadcast and any information or media content associated with the broadcast.

A tag associated with the data tag may be used to perform a number of different actions by a number of different systems. For example, a tag may be used to obtain additional information, advertisements, and/or access to (e.g., purchase, receive for free, etc.) media content. The media device may also use the tag to obtain additional information, advertisements, and/or access to (e.g., purchase, receive for free, etc.) non-media information. Media channels (such as radio stations and related data) can also be searched for and identified based on a tag. Lists of media associated with tags can also be compiled and displayed by the media device or any other device.

In some embodiments, the media device is electrically coupled to another device, such as a radio dock, radio adapter, host device, etc. The other device can then receive a broadcast signal and/or data associated with the signal, and provide signal and/or data to the media device. The other device may also be used to tag data and generate tags. The media device may then download the tags from the other device.

The media device may also receive a number of other signals from various other devices and sensors and generate data tags based on the other signals. For example, the media device can receive a location signal, such as, e.g., a GPS signal. The media device can generate a tag associated with the location signal in response to a user input to do so. The data tag can be stored and/or uploaded to another device.

Any tag discussed herein may be used to generate other types of information that can be presented to the user. For example, marketing and advertising information can be generated based on data tags. As another example, user profile and personalized information (e.g., personalized websites, etc.) can be generated using data tags.

In some embodiments, the user can connect the portable media device, e.g., via a network, to an asset delivery service, allowing stored tags to be communicated to the asset delivery service. The user can then interact with the asset delivery service to sample and/or acquire (e.g., download) media content, location information, maps, store information, restaurant menus, product information and reviews, and the like corresponding to the tags.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 2 is a table listing examples of metadata that can be captured by an accessory and/or a PMD according to an embodiment of the present invention.

FIG. 3 is a table identifying some types of metadata fields that may be supported by various broadcast data services.

FIG. 4C illustrates a hierarchical XML dictionary file that can be used to store tags according to an embodiment of the present invention.

DETAILED DESCRIPTION OF THE INVENTION

Figure 1A:
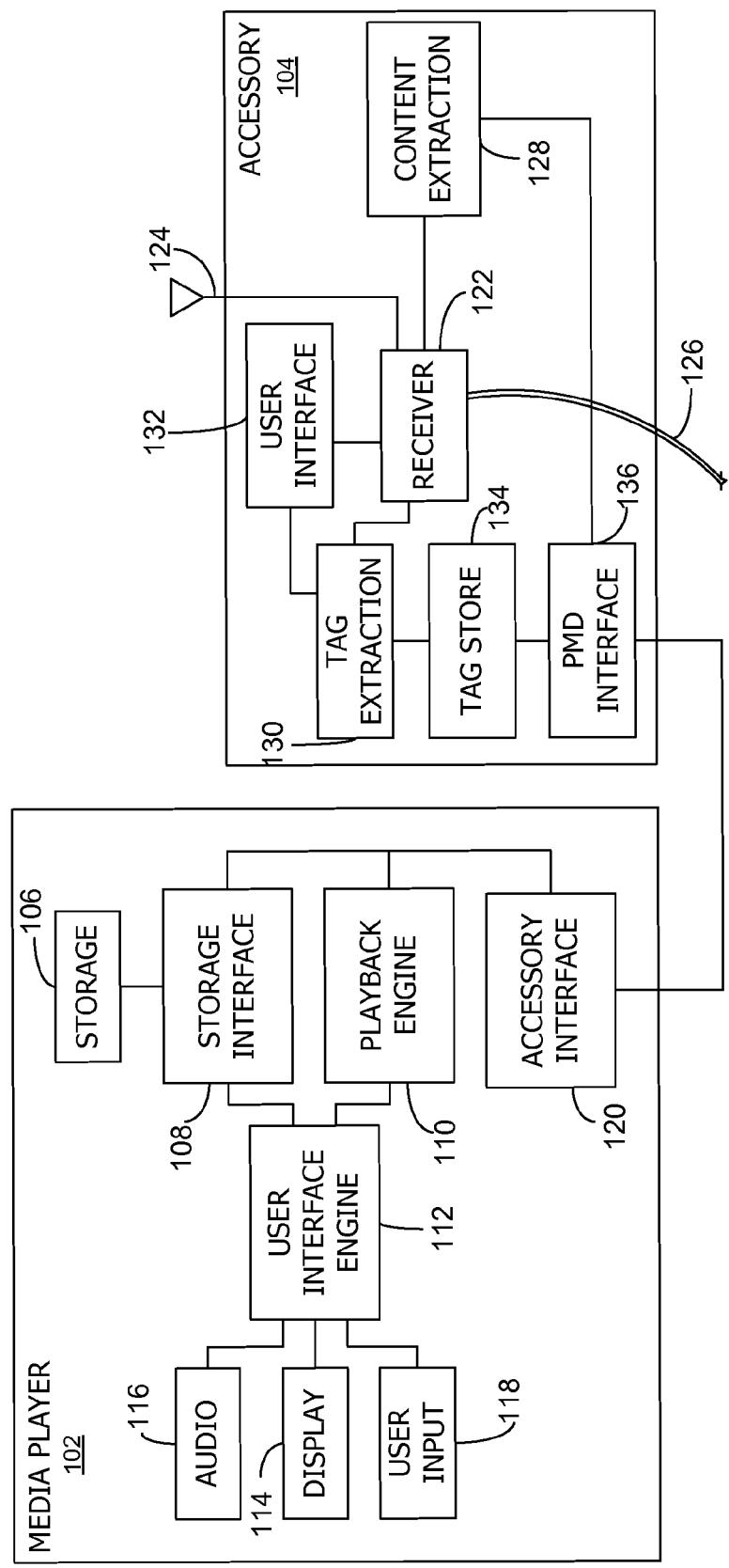
FIGS. 1A and 1B illustrate portable media device ("PMD") systems for tagging broadcast content according to an embodiment of the present invention.
Figure 1B:
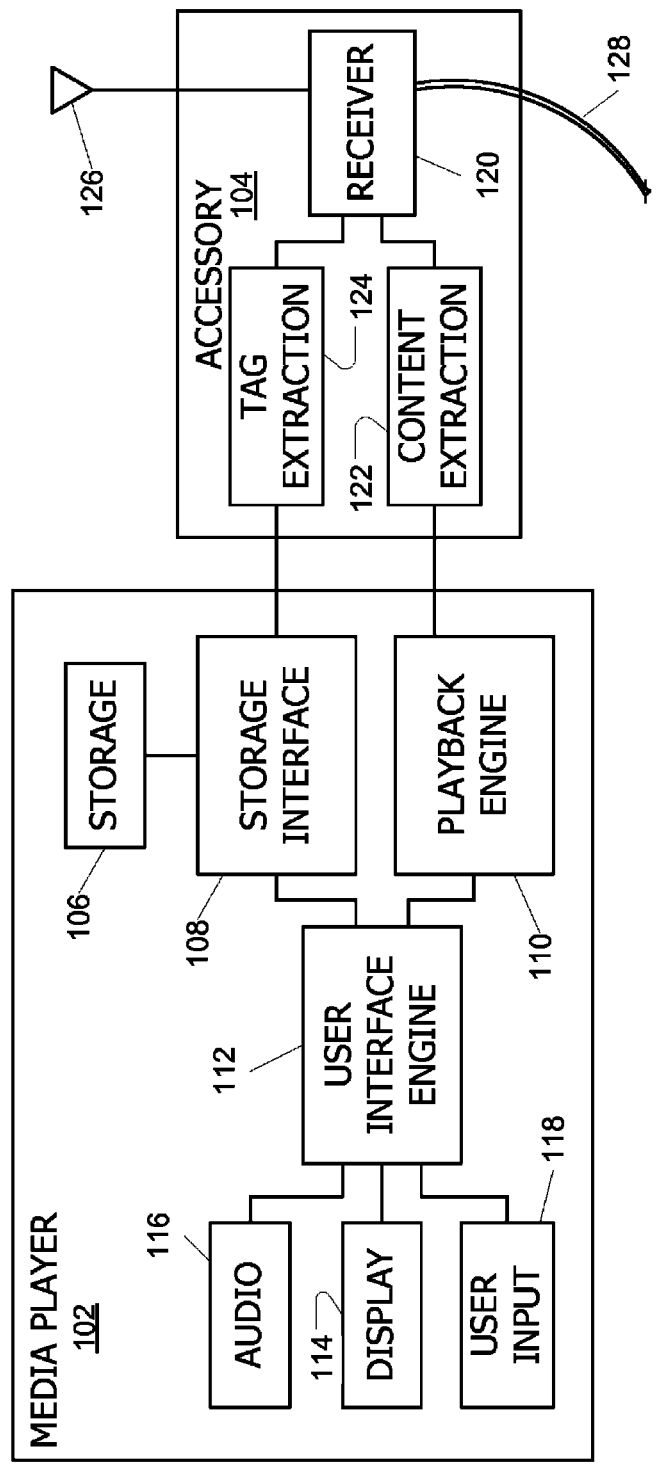

In accordance with some embodiments of the present invention, a portable media device and/or an accessory coupled thereto can be used to collect and store information about broadcasts received by the portable media device and/or accessory. The collected information, referred to herein as a "tag," can encompass any type of data that facilitates identification of a particular broadcasts (e.g., a song in the case of music broadcasts, a podcast, an episode of a TV program, a location associated with a GPS signal, a store/product/good/service associated with an advertisement, and the like).

In some embodiments, the portable media device can be coupled to an accessory that is capable of receiving broadcasts. The broadcast can include broadcast content as well as metadata identifying the content (e.g., track title, location, store/product) and/or the broadcaster. The accessory can capture the metadata (and/or a portion of the broadcast content itself) and provide the metadata (and/or content) as a "tag" to the portable media device, either in response to a user command or automatically.

In some embodiments, the user can connect the portable media device, e.g., via a network, to an asset delivery service, allowing stored tags to be communicated to the asset delivery service. The user can then interact with the asset delivery service to sample and/or acquire (e.g., download) media content, location information, maps, store information, restaurant menus, product information and reviews, and the like corresponding to the tags.

As used herein, a "broadcast" refers generally to real-time distribution of content (e.g., audio and/or visual data, location data, product information, etc.) via a wired or wireless medium to an arbitrary number of receivers that may be tuned in to receive it. Broadcast media can include, e.g., over-the-air radio or television (TV), satellite radio or TV, cable TV or music services, Internet streaming broadcasts, podcasts, satellite broadcasts, fiber optic distribution, and the like. Broadcast data may be transmitted in analog, digital and/or hybrid forms as is known in the art. In general, a receiver does not control when a broadcast begins or ends, although some receivers (e.g., audio or video recorders) may be able to store broadcast content for later presentation to a user.

Broadcasts of music and television can generally be divided into "tracks," where a track is simply a subset of the broadcast content that is logically regarded as a unit. For example, each song played by a radio station can be a track. A broadcast advertisement could also be a track. An episode of a TV series can be a track, or different segments of the episode (separated, e.g., by commercial breaks) can each be a track. A program such as a talk show can be treated as a single track or divided into multiple tracks, e.g., based on the topics covered, the segmentation of the program due to advertisements, or the like. In some instances, an entire broadcast (e.g., a podcast) may be identified as a single track. In some embodiments described herein, a track can be identified based on metadata created and embedded in the broadcast, e.g., by an originator of the broadcast; when some or all of the metadata changes, a new track is indicated. A suitably configured receiver can detect and extract this metadata from the received broadcast and thereby determine when a track begins or ends.

A "portable media device" (or "PMD") as used herein refers generally to any electronic device with the capability of storing and playing media assets, including but not limited to audio assets, video assets, still images, and the like. The portable PMD can be connected to an accessory that includes a receiver, which can be any device capable of receiving a broadcast via any applicable medium (e.g., as listed above). Alternatively, a receiver can be integrated into the PMD.

In accordance with some embodiments of the present invention, the PMD can be operated to store a tag representing a broadcast track received by the receiver. As used herein, the term "tag" can encompass any type of data that facilitates identification of a particular track. Examples include: track-identifying metadata that is broadcast in association with the track; a captured portion of the broadcast content that can be analyzed and compared to known samples of tracks; and/or information identifying a source and time of the broadcast that can later be matched to a listing of the source's broadcasting activity. The tag can be provided to a media asset management and/or delivery service that sells or otherwise distributes media assets including the tagged tracks; examples of such services include the iTunes™ service provided by Apple, Inc., the Y! Music™ Unlimited service provided by Yahoo!, Inc., or the Zune™ Marketplace provided by Microsoft Corp. The media asset management and/or delivery service can use the tag to identify and provide access to the track and/or related information. For example, the user of a portable PMD that has stored tags may connect to the service and thereupon be prompted to download a tagged track, experience a preview of a tagged track, or the like.

Systems for Tagging Broadcasts

FIG. 1A illustrates PMD system 100 for tagging broadcast content according to an embodiment of the present invention. System 100 includes PMD 102 coupled to accessory 104, which is capable of receiving broadcasts. In one embodiment, PMD 102 can be, e.g., an iPod™ or iPhone™ PMD produced by Apple, Inc., and accessory 104 can be any device that is capable of receiving broadcasts and communicating with PMD 102, such as a suitably configured radio receiver (e.g., FM, AM or satellite radio in standard or hybrid digital ("HD" formats)), an HDTV-capable receiver or the like.

In this embodiment, PMD 102 can include storage device 106, storage interface engine 108, playback engine 110, user interface engine 112, display 114, audio output device 116, user input control(s) 118, and accessory interface 120. In one embodiment, display 114 can include, e.g., an LCD screen, and audio output device 116 can include, e.g., a conventional headphones jack and/or one or more speakers. User input control(s) 118 can include, e.g., one or more buttons, touch pads, touch screens, scroll wheels, click wheels, or any other control(s) capable of generating electrical signals corresponding to manipulations of the control(s) by a user.

User interface engine 112 can include any combination of circuitry and/or software that enables a user to control operation of PMD 102. In one embodiment, user interface engine 112 receives user inputs from user input control(s) 118 and provides corresponding commands to storage interface 108 and/or playback engine 110. User interface engine 112 also receives data from storage interface 108 and/or playback engine 110 and provides corresponding output to a user via display 114 and/or audio output device 116. In some embodiments, user interface engine 112 also delivers media content from playback engine 108 to display 114 and/or audio output device 116. User interface engine 112 in some embodiments can also receive user input related to tagging of broadcast tracks, as described below.

Storage device 106 can be used to store information including media assets (e.g., music, video, podcasts, photos or other still images, etc.) as well as tags associated with broadcast tracks, as described below. Storage device 106 can include, e.g., magnetic or optical disk, flash memory, or any other storage medium that supports storage of data for an arbitrary period of time (e.g., until deleted by a user). Storage interface engine 108 can include any combination of circuitry and/or software that manages access to storage device 106. In one embodiment, storage interface engine 108 supports reading from and writing to storage device 106.

Playback engine 110 can include any combination of circuitry and/or software that manages playback of media assets stored in storage device 106 and, in some embodiments, playback of broadcast content received by accessory 104. In some embodiments, playback engine 110 responds to commands from user interface engine 112 and/or commands delivered from an accessory via accessory interface 120.

Accessory interface module 120 can include a connector providing mechanical and/or electrical coupling to accessory 104. In some embodiments, a "wired" coupling—e.g., a direct connection or a connection via a suitable cable—may be provided. Alternatively, accessory interface module 120 can implement a wireless connection (e.g., using Bluetooth or other wireless connection protocols). Accessory interface module 120 can also include other hardware components (e.g., logic circuits) and/or software components to interpret signals received from accessory 104 and/or to generate signals to be transmitted to accessory 104. Such signals may represent, e.g., commands and/or data being exchanged between PMD 102 and accessory 104, including commands and/or data related to tagging of broadcast tracks as described below.

Aspects of storage interface engine 108, playback engine 110, user interface engine 112, and accessory interface 120 can be implemented, e.g., using software programs running on one or more suitably configured microprocessors or microcontrollers (not explicitly shown). Other implementations are also possible; for instance, some or all of storage interface engine 108, playback engine 110, user interface engine 112, and/or accessory interface 120 might be implemented on different, interconnected processors.

Accessory 104 can be any accessory capable of receiving broadcasts. In the embodiment of FIG. 1A, accessory 104 includes receiver component 122 coupled to antenna 124 and/or cable 126, content extraction engine 128, tag extraction engine 130, user interface 132, tag store 134, and PMD interface 136.

Receiver component 122 can be used to receive broadcasts via one or more media; any broadcast medium or combination of media can be supported. In this example, receiver component 122 can connect to antenna 124, which can be capable of detecting broadcasts via a wireless medium (e.g., FM or AM radio in standard and/or HD formats, over-the-air TV, satellite TV or radio, WiFi, cellular communication network, etc.). Receiver component 122 can also connect to cable 126 and thus be capable of receiving broadcasts via a wired medium (e.g., cable TV service, wired Internet connection, or the like). Receiver component 122 may include any hardware and/or software elements usable to extract broadcast data from wired and/or wireless media as desired; the particular components will depend on the medium (or media) supported. Any combination or sub-combination of wired and/or wireless media can be supported.

Receiver component 122 can deliver signals corresponding to received broadcasts to content extraction engine 128 to deliver media content. Content extraction engine 128 can include appropriate decoding and processing components to extract audio and/or video signals from a received broadcast; these components can generate analog and/or digital signals suitable for driving video and/or audio output devices (not explicitly shown in FIG. 1A), such as display devices and/or speakers. Such output devices can be integrated into accessory 104 or supplied as external components coupled to accessory 104 via suitable connections. In addition or alternatively, content extraction engine 128 can deliver extracted content to PMD 102 via player interface 136, and PMD 102 can play the content via its own output devices. In other embodiments, an accessory 104 can be configured to selectably deliver media content to either media output devices connected to content extraction module 128 or PMD 102 or both. Thus, accessory 104 can operate while connected to PMD 102 and can also operate in a standalone mode (i.e., not connected to PMD 102).

User interface 132 of accessory 104 can provide input and/or output devices to allow a user to control the operation of receiver 122, content extraction engine 128, and/or tag extraction engine 130. For example, user interface 132 can include a button that a user can operate to instruct tag extraction engine 124 to capture or record the metadata for a currently playing track. Other buttons may allow the user to select broadcast sources and/or channels for receiver 122, adjust volume and/or picture settings, and so on.

Receiver component 122 also communicates with tag extraction engine 130. Tag extraction engine 130 captures tag information associated with broadcast content and provides the tag information to tag storage area 134. Tag storage area 134 can be used to store tags that a user of accessory 104 might opt to capture at times when accessory 104 is operating in standalone mode. Tag storage area 134 can be implemented using nonvolatile storage (e.g., magnetic or optical disk, flash memory or other storage media) and can thus store tags indefinitely, regardless of whether power is continuously supplied to accessory 104. As described below, in some embodiments, tags that a user opts to capture while accessory 104 is in standalone mode can be stored in tag storage area 134 until such time as accessory 104 is next connected to PMD 102. At that point, PMD interface 136 of accessory 104 can deliver the stored tags to PMD 102 via accessory interface 120. Accessory interface 120 can communicate with storage engine 108 to store the tags in PMD storage device 106. In other embodiments, accessory 104 might not include nonvolatile tag storage and preservation of tags may be possible only when PMD 102 is connected to accessory 104.

PMD interface 136 communicates with accessory interface 120 of PMD 102. As described above, the communication may be via a wired or wireless channel. Aspects of communication between PMD 102 and accessory 104 relevant to embodiments of the present invention are described below.

Aspects of receiver 122, content extraction engine 126, tag extraction engine 130, user interface 132, and PMD interface 136 can be implemented, e.g., using software executing on one or more suitably configured microprocessors or microcontrollers (not explicitly shown). Other implementations are also possible.

System 100 can also include other components in addition to or instead of those shown here. For example, accessory 104 may include a storage device capable of storing broadcast content and may be operated as a recorder of such content. Alternatively, accessory 104 may be capable of delivering broadcast content to PMD 102 for storage in storage device 106 rather than immediate playback. In some embodiments, PMD 102 and/or accessory 104 may include fewer components than those shown herein. For example, if accessory 104 can be controlled via PMD 102, a separate user interface for accessory 104 might not be provided. As another example, in embodiments where accessory 104 is operable to tag broadcast content only when connected to PMD 102, tag storage area 134 might be omitted.

The various components of system 100 can be packaged and/or sold as one or more separate devices. For example, PMD 102 could include any or all of the components of accessory 104; thus, in one embodiment, content extraction engine 128 and/or tag extraction engine 130 could be implemented on the same microprocessor(s) as storage interface engine 108, playback engine 110 and user interface engine 112.

Where some or all components of accessory 104 are packaged and/or sold separately from PMD 102, accessory 104 can include its own user input controls and/or user output devices as noted above. A user may be able to operate PMD 104 by remote control via user interface 132 of accessory 104 and/or to use output devices of accessory 104 to play media content stored by PMD 102; similarly, the user may be able to use controls 118 of PMD 102 to operate accessory 104 and/or use display 114 and/or audio output device 116 of PMD 102 to play broadcast content received by accessory 104. For example, PMD 104 can provide a graphical radio tuner on display device 114 that can be adjusted using, e.g., user input control 118; accessory interface 120 can relay information relating to the adjustment to accessory 104, and receiver component 122 can modify its tuning accordingly.

In one embodiment, user interface 124 of accessory 104 can include a control that a user can operate to tag broadcast content. For example, user interface 124 can include a "Tag" button that the user can press at any time while listening to or watching broadcast media to indicate that a currently playing track should be tagged. Alternatively, user input devices 118 of PMD 102 can include a "Tag" button or other control that a user can operate to tag broadcast content.

When the "Tag" button (or other control) is operated, accessory 104 captures (or collects) a tag associated with the broadcast content. In one embodiment, the tag can include metadata that is captured from the broadcast itself and/or from other information available to accessory 104. For example, if the broadcast content is a song, identifying information transmitted in the broadcast might include, e.g., the title of the song, the name of the artist, the title of the album from which the song was extracted, a standard identification code associated with the song, or the like. If the broadcast content is a video program (e.g., an episode of a TV series), the identifying information might include, e.g., the title of the series, the title of the episode, an identification code for the series or episode, the original air date, the names of actors, directors, writers or producers involved in the episode, or the like. If the broadcast content is location information (e.g., a GPS signal), the identifying information might include, e.g., the latitude, the longitude, an altitude, the time, or the like. If the broadcast content is an advertisement (e.g., an radio ad or a TV ad), the identifying information might include, e.g., the name of the product/good/service, the price, one or locations where the product is sold, references to product literature, or the like. The metadata may also include information identifying the source of the broadcast, such as the call sign and dominant market area (DMA) of a radio or TV station, identification of a radio or TV network with which the broadcaster is affiliated, identification of a GPS satellite, cell tower, WiFi hotspot, billboard, shopping center, restaurant, or the like that identifies the source of a broadcast.

In addition to or instead of extracting metadata from the broadcast itself, accessory 104 in some embodiments can capture a portion of the broadcast content for later use in identifying the broadcast. The captured portion can be, e.g., any portion usable as a "fingerprint" to identify the broadcast from which the portion was captured. For example, in the case of a digital broadcast, the digital sample values representing a second or two of the content might be captured. For an analog broadcast, digital sample values corresponding to the analog representation of a second or two of the broadcast content might be captured. The captured portion can be, e.g., a first portion, a last portion, or any other arbitrary portion of the broadcast content. As used herein, the term "tag" can encompass a captured portion of the broadcast content in addition to or instead of metadata that is associated with but not part of the broadcast content.

Additional metadata can be generated by accessory 104. For example, if the broadcast originates from a radio or TV station, accessory 104 can provide the frequency or channel to which it was tuned even if the transmitted metadata does not include identification of the broadcast's source. Accessory 104 might also add a timestamp indicating when the broadcast was received or tagged, or similar information.

Accessory 104 can communicate the collected tag information to PMD 102, which can store the tag in storage device 106. Communication and storing of tags is described further below.

In some embodiments, accessory 104 and/or PMD 102 can provide graphical information to the user about the broadcast content. For example, tag extraction engine 130 can supply metadata (or other information) pertaining to the currently playing track to a display device of accessory 104, or the metadata can be delivered to PMD 102 for display on PMD display device 114. Graphical information can include text (e.g., title and artist of a song or other program information, location information, directions, menus, and product information), still images (e.g., album covers, maps, product images or advertisements), or animated images (e.g., a music video corresponding to the audio track or advertisement).

Figure 1C:
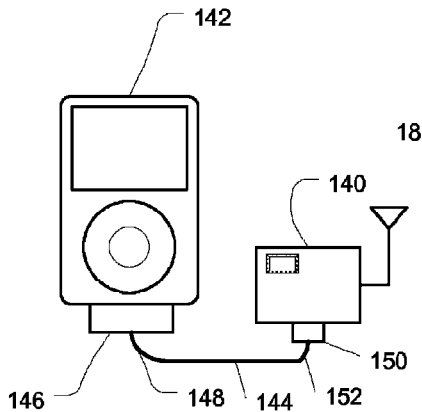
FIGS. 1C-1G illustrate a few of the many possible configurations of a PMD and accessory according to various embodiments of the present invention.

PMD 102 and accessory 104 can be realized in a variety of devices having varying form factors, components, and connections. FIGS. 1C-1G illustrate a few of the many possible configurations. In FIG. 1C, portable radio adaptor 140 embodies aspects of accessory 104, and media player 142 embodies aspects of PMD 102. Portable radio adaptor 140 can connect to media player 142 via cable 144. In this embodiment, media player 142 includes connector 146 adapted to connect to one end 148 of cable 144 while portable radio adaptor 140 includes connector 150 adapted to connect to the other end 152 of cable 144. Connectors 146 and 150 might or might not have the same form factor, number of pins, etc. For example, connector 146 can be a 30-pin connector such as is used on iPod™ media players while connector 150 can be a USB (Universal Serial Bus) or FireWire connector or other standard or custom connector. In still other embodiments, media player 142 and portable radio adaptor 140 can each include a wireless interface (e.g., Bluetooth), allowing media player 142 and portable radio adaptor 140 to communicate with each other without a physical connection.

In FIG. 1D, media player 142 again embodies aspects of PMD 102, while radio dock 160 embodies aspects of accessory 104. PMD 102 can be inserted into connector 162 of radio dock 160. In this example, radio dock 160 is connected via cable 164 to broadcast medium 166. Medium 166 could be, e.g., a cable TV network, the Internet, GPS receiver or any other network to which a wired connection is possible and via which a broadcast can be received. Although not expressly shown, it is to be understood that the broadcast medium can also be a wireless medium, and radio dock 160 can include an antenna or other suitable components for receiving wireless broadcasts.

Figure 1F:
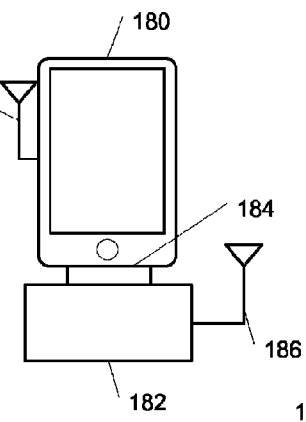
Figure 1G:
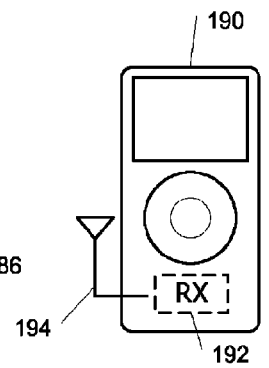
Figure 1D:
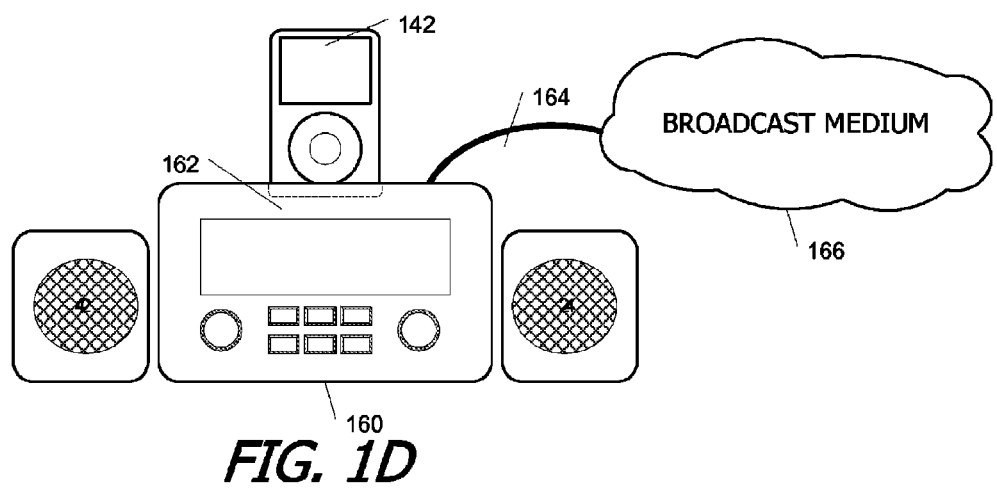
Figure 1E:
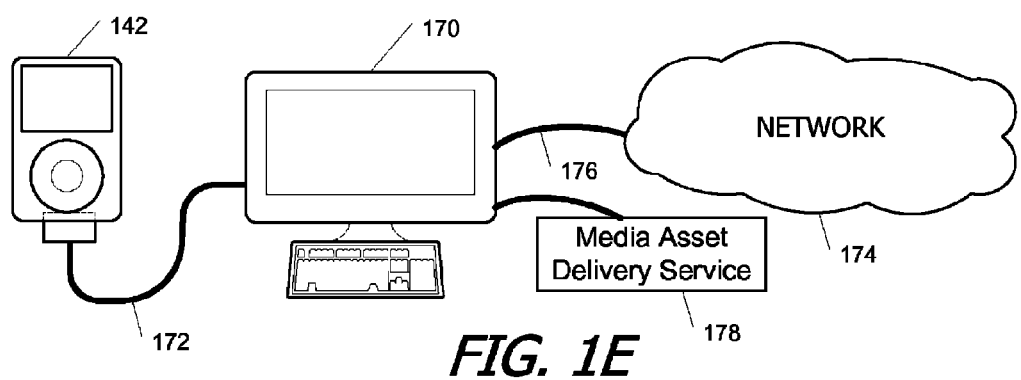

FIG. 1E shows yet another configuration, in which media player 142 can be connected to computer system 170 via cable 172. Computer system 170, which may be of generally conventional design, can be connected to network 174 (e.g., the Internet) via cable 176. (A wireless connection can be substituted for either or both of cables 172 and 176.) In this embodiment, computer system 170 may be used as a receiver for media content that is broadcast via network 174; for example, radio or TV content streamed via the Internet. In addition, computer system 170 might include a TV or radio tuner card that can be connected to an antenna or cable to provide TV or radio content to computer system 170.

Computer system 170 may also be used as a host to connect media player 142 (or other embodiments of PMD 102) to media asset delivery service 178 that sells or otherwise distributes media assets (such as songs, movies, episodes of TV or radio shows, podcasts, and the like). Examples of media asset delivery services include the iTunes™ Store service provided by Apple, Inc., the Y! Music™ Unlimited service provided by Yahoo!, Inc., or the Zune™ Marketplace service provided by Microsoft Corp.; other services might also be used. When connected to such a service, tags previously stored on media player 142 can be used to identify media assets that the user might be interested in purchasing. In one embodiment, the user of computer system 170 can view a list of previously tagged tracks and select any or all of the tracks for purchase. Some examples of specific processes for interacting with online media asset services using stored tags are described below. Other examples are described in U.S. patent application Ser. No. 11/210,172 (U.S. Patent App. Pub. No. 2006/0235864 A1).

FIG. 1F illustrates yet another configuration, in which mobile telephone and media device 180 embodies aspects of PMD 102 while radio adaptor 182 embodies aspects of accessory 104. Mobile telephone and media device 180 can be connected to radio adaptor 182 that has connector 184 adapted to mate directly to a connector port of mobile telephone and media device 180. In the embodiment as shown, radio adaptor 182 has antenna 186 adapted to receive radio broadcasts (e.g., any of the radio formats mentioned above), while mobile telephone and media device 180 has antenna 188 adapted to provide two-way communication with a data network. For instance mobile telephone and media device 180 and antenna 188 may support a WiFi protocol that enables communication between mobile telephone and media device 180 and a wireless Internet access point. Although shown as external components, antennas 186 and 188 may be integrated into the respective housings of mobile telephone and media device 180 and radio adaptor 182 or may protrude therefrom.

In FIG. 1G, portable media device 190 embodies aspects of both PMD 102 and accessory 104. PMD 190 can include an integrated radio receiver 192 and antenna 194. As in other embodiments, antenna 194 may be integrated into the housing of PMD 190 or may protrude therefrom. Radio receiver 192 can be adapted to receive various types of radio broadcasts, including any of the formats mentioned above. PMD 190 can be adapted to connect to a data network, e.g., via wired or wireless connection (not explicitly shown in FIG. 1F).

It will be appreciated that the PMD systems described herein are illustrative and that variations and modifications are possible. A PMD may include any device capable of storing and/or playing media content for a user, and broadcast-receiving capability may be provided by a detachable receiver accessory or by receiver components built into the PMD. Further, although the embodiments of FIGS. 1C-1G may make specific reference to radio accessories, it is to be understood that an accessory can receive other types of media broadcasts in addition to or instead of radio broadcasts. PMD 102 and accessory 104 may also provide additional capabilities (e.g., recording broadcasts; making and receiving telephone calls; managing personal information such as contacts and calendar; communicating via e-mail, text messaging, instant messaging, etc.) as desired.

Although PMD 102 and accessory 104 are described herein with reference to particular blocks and modules, it is to be understood that these blocks and modules are defined for convenience of description and are not intended to imply a particular physical arrangement of component parts. Further, the blocks/modules need not correspond to physically distinct components. For instance, those skilled in the art will appreciate that different combinations of hardware and/or software components may also be used and that particular operations or features described as being implemented in software might also be implemented in hardware or vice versa.

Content of Tags

In accordance with an embodiment of the present invention, an accessory such as accessory 104 of FIG. 1A and/or a PMD such as PMD 102 of FIG. 1A can capture and store tags related to broadcast content. As noted above, the term "tag" can encompass any type of data that facilitates identification of a particular track. Examples of tags will now be described; it is to be understood that these examples are illustrative and not limiting.

In some embodiments, a tag includes metadata associated with a received broadcast. Metadata can be available, e.g., in digital audio or video broadcast streams, such as HD radio or HDTV broadcasts. In some embodiments, one or more of the following sources can be used: radio data system (RDS) data, UPC data, international standard recording code (ISRC) data, GRID data, All Media Guide (AMG) data, application specific data (e.g., such as that used in media management and delivery systems similar to that offered under the trademark iTunes™ by Apple Inc. of Cupertino, Calif.), or any combination thereof.

A variety of information about the track and/or the broadcaster may be included in the metadata. FIG. 2 is a table 200 listing examples of metadata that can be captured by accessory 104 and/or PMD 102 according to an embodiment of the present invention. In the table of FIG. 2, the broadcast is an audio track (e.g., a song) received from a radio station; it will be appreciated that other types of broadcast content (e.g., video broadcasts, spoken-word broadcasts, etc.) could also be tagged using similar metadata.

Metadata in one embodiment includes track-identifying information, such as track name (or title), artist name, album name, or a combination thereof. Metadata can also include a track identification code (TrackIdentifier), which can be, e.g., a unique numerical value or character string identifier associated with the track. Multiple track identifiers may be supported. For example, various standard track identifiers such as an AMG identifier, an International Standard Recording Code (ISRC), or Global Release Identifier (GRid) can be used. In addition, a proprietor of a media delivery service (such as, for instance, the iTunes Store™ service of Apple Inc.) can define its own unique track identifiers and make those identifiers available to broadcast partners (selected broadcasters or all broadcasters); the broadcast partners can then embed these track identifiers as metadata in their broadcasts.

Metadata can also have temporal aspects. For example, the metadata associated with a radio talk show may change as the topics change. In this manner, the PMD can receive nontemporal metadata associated with the talk show, which is consistent for the length of the talk show, as well as temporal metadata that can be directed, e.g., to a book while the book is being discussed during the talk show or to a celebrity while the celebrity is being discussed during the talk show.

Station-identifying information can also be embedded in the broadcast data stream and extracted as metadata, e.g., by tag extraction engine 130 of accessory 104 of FIG. 1A. Station identifying information can include, for example, station frequency, station name, station genre, station call letters, station tagline, program name, disc jockey name, station message, station designated market area (DMA), station website URL, network affiliation of the station, or any combination thereof. In some embodiments, a broadcaster may register as a "broadcast partner" of a media asset delivery service (e.g., media asset delivery service 178 of FIG. 1D). The service assigns a unique affiliate identifier to each broadcast partner, and the broadcast partner can include its affiliate identifier in the metadata for each track it broadcasts. If a user tags a track, the affiliate identifier can be recorded as part of the tag, and when a recorded tag is provided to media asset delivery service 178, the service receives the affiliate identifier. In the event that the user purchases the tagged track, the service can use the affiliate identifier to award payment or other credit to the broadcast partner whose broadcast led to the purchase. (Purchasing of tagged tracks is described further below.)

In some embodiments, metadata can also include images associated with the track, e.g., album art, cover or images from a book, or the like (not listed in FIG. 2). Metadata can also include a timestamp indicating the date and time that the track was tagged. In some embodiments, a timestamp can be used in conjunction with station identifying information to identify the tagged track. For instance, when PMD 102 is connected to a data network (e.g., via host computer 170 as shown in FIG. 1D or wirelessly as shown in FIG. 1E), the stored tag information can be used to access a database in a server connected to the data network to identify the media asset that was being played at the stated time on the stated station frequency or name.

A tag can also include other information that might or might not be part of the received metadata. For example, other identification information can include in point, out point, country code, media type, program type, version information, hardware or manufacturer ID of the accessory that captured the tag, podcast feed information, or any other suitable information. If station-identifying information (e.g., frequency) is not included in the metadata, an accessory can be configured to add this information to the tag, e.g., by recording the frequency to which it was tuned when the track was tagged.

In some embodiments, a tag can be required to include a subset of the fields in FIG. 2, with other fields being optional. For instance, in some embodiments, the Name, Artist, and Album fields may be sufficient to uniquely identify most tracks, and all other fields can be made optional. In some embodiments, tag extraction engine 130 of accessory 104 (FIG. 1A) is configured to populate every field of the tag for which the broadcast source provides sufficient metadata. Further, the available fields can also include an "Unknown" field, which tag extraction engine 130 can populate with any received metadata that the accessory does not recognize. Populating the unknown field makes the unrecognized metadata available to PMD 102 and potentially to media asset delivery service 178 (or other service) with which PMD 102 communicates as described below. Media asset delivery service 178 (or other service) or PMD 102 may be able to interpret the unrecognized metadata. Thus, a tag is not limited to any particular combination of metadata fields.

In another embodiment, accessory 104 and/or PMD 102 can capture a portion of the broadcast content in a tag, in addition to or instead of metadata extracted from the broadcast stream. It is to be understood that a tag need not include all possible identifying information.

The amount and type of information available to be stored in a tag can depend on the broadcast source. In addition, different broadcast signals can include different types and/or different amounts of information. FIG. 3 is a table 300 identifying some types of data fields supported by various known radio data services, such as HD radio program service data (PSD), HD radio station information service (SIS), HD radio SIG, RDS, and satellite radio program associated data (PAD). Table 300 also identifies data fields that might be supported in an enterprise partner feed (EPF) used by broadcast partners of a media asset delivery service.

Alternative identification information and methods of identifying a media asset currently being broadcast that are known in the art or otherwise may also be used, including any combination of the above-described methods. Tag information can be received by an accessory or directly by a PMD in a variety of formats, and any combination of information identifying the track and/or the broadcaster (or other source) may be included in a tag.

In some embodiments, multiple networks may be used to provide the broadcast content and the tag information. For example, a PMD such as PMD 102 of FIG. 1A and/or an accessory such as accessory 104 of FIG. 1A can communicate via multiple communication networks capable of simultaneously accepting and playing a media broadcast (e.g., a radio broadcast, a television broadcast, a telephone call, etc.). The present invention can include systems and methods that use two or more of those communication networks in an integrated manner.

Figure 4A:
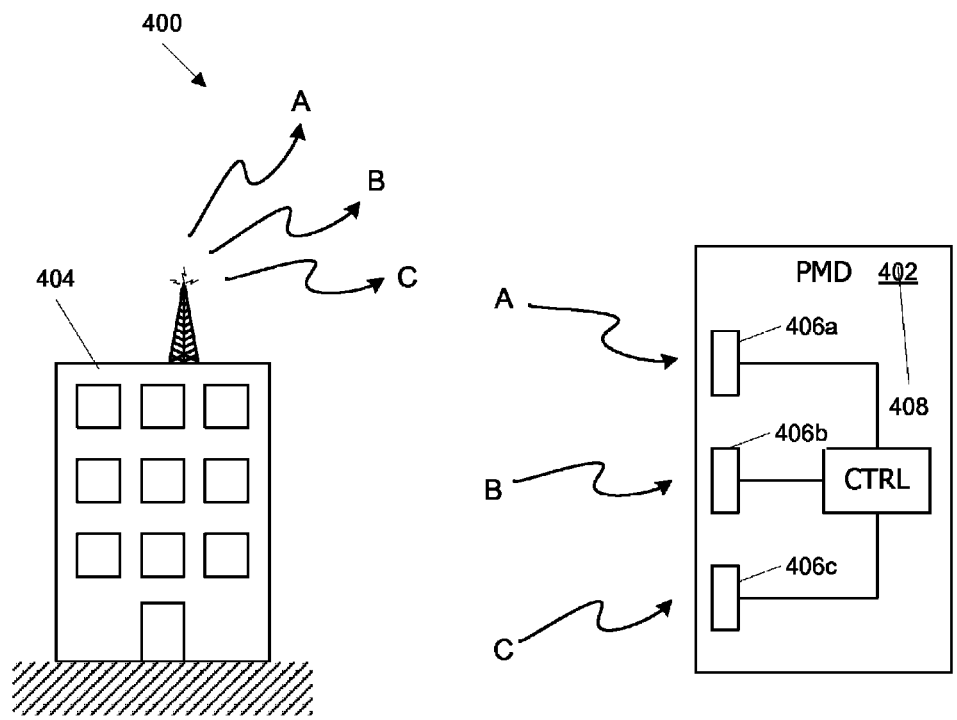
FIGS. 4A and 4B illustrate systems in which a PMD uses two or more communication networks in an integrated manner in accordance with one embodiment of the present invention.
Figure 4B:
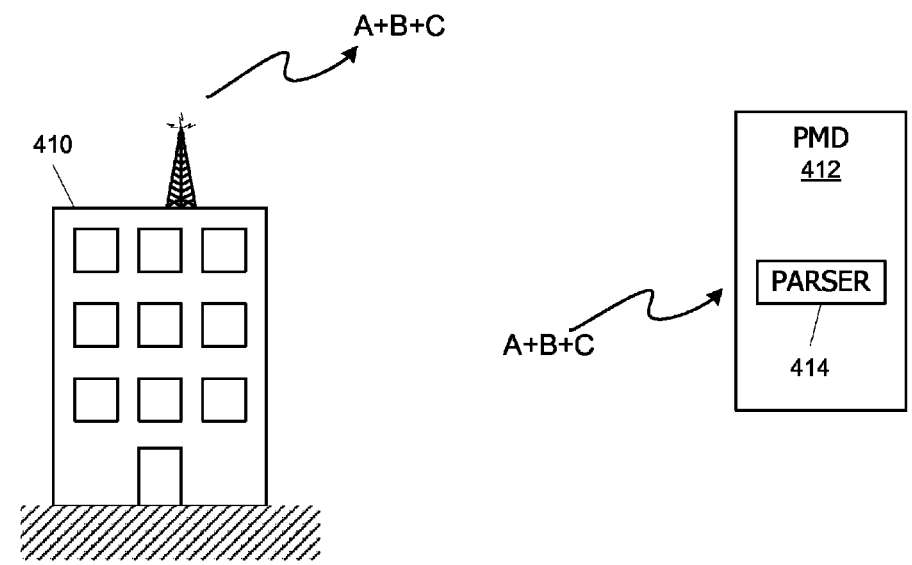

FIGS. 4A and 4B illustrate systems in which a PMD uses two or more communication networks in an integrated manner in accordance with one embodiment of the present invention. Referring first to FIG. 4A, system 400 includes PMD 402 and broadcaster 404. System 400 can manage media information transmission (e.g., media track metadata) when there are bandwidth constraints. For example, in some cases, it may be desirable to provide large amounts of metadata with a media broadcast. However, due to bandwidth limits, it may be impractical to do so. System 400 can solve this problem by using bandwidth from more than one communication network to send large amounts of information for the same media broadcast. Some embodiments of the present invention provide for transmitting and downloading information (e.g., metadata) requiring larger bandwidth and/or transmitting and downloading information more quickly by communicating different portions of the information using different communication networks.

For example, in one embodiment, broadcaster 404 can transmit a media broadcast in multiple data segments A, B, and C, each of which can be encoded in a different communication format. The multiple communication formats can be appropriate for different communication networks (e.g., cellular, internet, terrestrial radio, satellite radio, terrestrial cable, satellite cable, GPS, etc.). PMD 402 can be equipped with multiple communication receivers 406a-c configured for receiving the multiple data segments in accordance with the different communication formats. Controller 408 processes and combines the multiple data segments as appropriate to reconstruct the complete transmission.

In an alternative embodiment of the present invention, shown in FIG. 4B, media broadcaster 410 can transmit the media broadcast in a single type of communication format. PMD 412 can include parser 414, which can receive the media broadcast and parse the signal into multiple data segments A, B, and C, each of which can be encoded in a different communication format.

Storing Tags in a PMD

In accordance with an embodiment of the present invention, tag information related to a broadcast can be stored in storage device 106 of PMD 102 of FIG. 1A. As described below, the tag information can be stored in a structured data file and later accessed by accessory 104 or a different accessory (e.g., computer system 170 of FIG. 1D used as a host).

In one embodiment, the structured data file can include an XML dictionary representing the metadata for each tagged track. As is generally known in the art, an XML dictionary provides a set of key-value pairs. The dictionary can be hierarchical; that is, the value associated with a particular key can be a dictionary. Various XML formats can be used; in one embodiment, the XML file is formatted as a Mac OS X Core Foundation property list.

FIG. 4C illustrates a hierarchical XML dictionary file 400 that can be used to store tags according to an embodiment of the present invention. The top-level keys in this embodiment includes:

(1) Version information. The MajorVersion and MinorVersion keys can specify the version of the XML dictionary file format. In one embodiment, files with different major versions might not be compatible with each other; files with the same major version but different minor versions are compatible with each other.

(2) Manufacturer-identifying information for the manufacturer of the accessory that collected the tags. ManufacturerID can be a unique numeric identifier of the manufacturer. In one embodiment, this identifier is assigned by a manufacturer of a line of PMDs to authorized manufacturers of accessories that interoperate with those PMDs. ManufacturerName can be the name of the manufacturer of the accessory. DeviceName can be a model name or other manufacturer-assigned name for the accessory device. iTunesAffiliateID can be used to identify the manufacturer as an affiliate of the iTunes Store™. (Other affiliations might be provided in addition to or instead of an iTunes Store™ affiliation, e.g., an affiliation with a different media asset management and/or downloading service.)

(3) A MarkedTracks key, whose associated value can be an array of one or more lower-level dictionaries. Each lower level dictionary can represent the tag information for a particular track. The tag information can include, e.g., any or all of the fields listed in FIG. 2.

Tagging

Figure 5:
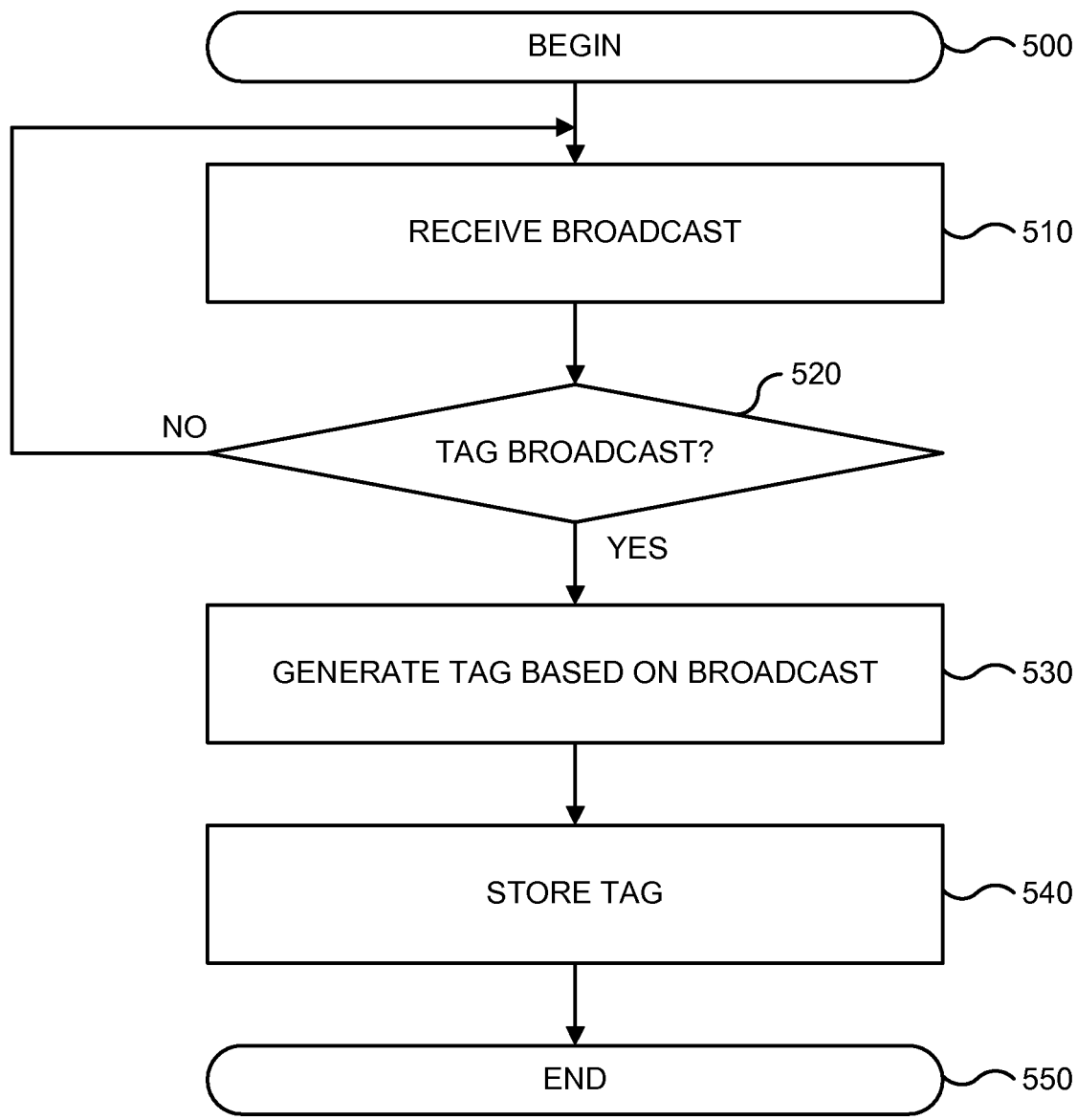
FIG. 5 is a simplified method for tagging a broadcast in accordance with one embodiment of the present invention.

FIG. 5 is a simplified method for tagging a broadcast in accordance with one embodiment of the present invention. The processing depicted in FIG. 5 may be performed by software modules (e.g., instructions or code) executed by a processor of a portable media player (e.g., PMD 102 of FIG. 1), by hardware modules, or combinations thereof. FIG. 5 begins in step 500.

In step 510, PMD 102 (or an associated accessory) receives a broadcast. For example, PMD 102 may receive a terrestrial radio broadcast, a TV broadcast, a WiFi broadcast, a Bluetooth broadcast, a GPS broadcast, low-power FM broadcast, a remote sensor broadcast, and the like. In step 520, a determination is made whether to tag the broadcast. For example, a user may press a button indicating a desire to tag the broadcast. In another example, PMD 102 may automatically tag the broadcast in response to rules, criteria, policies, previous tags, and the like.

In step 530, PMD 102 (or an associated device) generates a tag based on the broadcast. For example, PMD 102 may generate the tag based on content included within the broadcast. In another example, PMD 102 may generate the tag based on metadata associated with the broadcast. Any variety of tags may be generated based on the broadcast. Some examples are a location tag generate in response to a GPS signal or location beacon, an advertisement tag generated in response to a broadcast indicative of an advertisement for a product (e.g., a good or service), and the like.

In step 540, PMD 102 stores the tag. PMD 102 may store the tag in a local storage, such as a memory or hard disk. FIG. 5 ends in step 550.

In accordance with another aspect of the present invention, PMD 102 may intelligently suggest media tracks, media channels, and non-media information to a user in response to tagged a broadcast. The suggestions may be based on, for example, a GPS signal, a user's media tags, and the user's media library.

Figure 6:
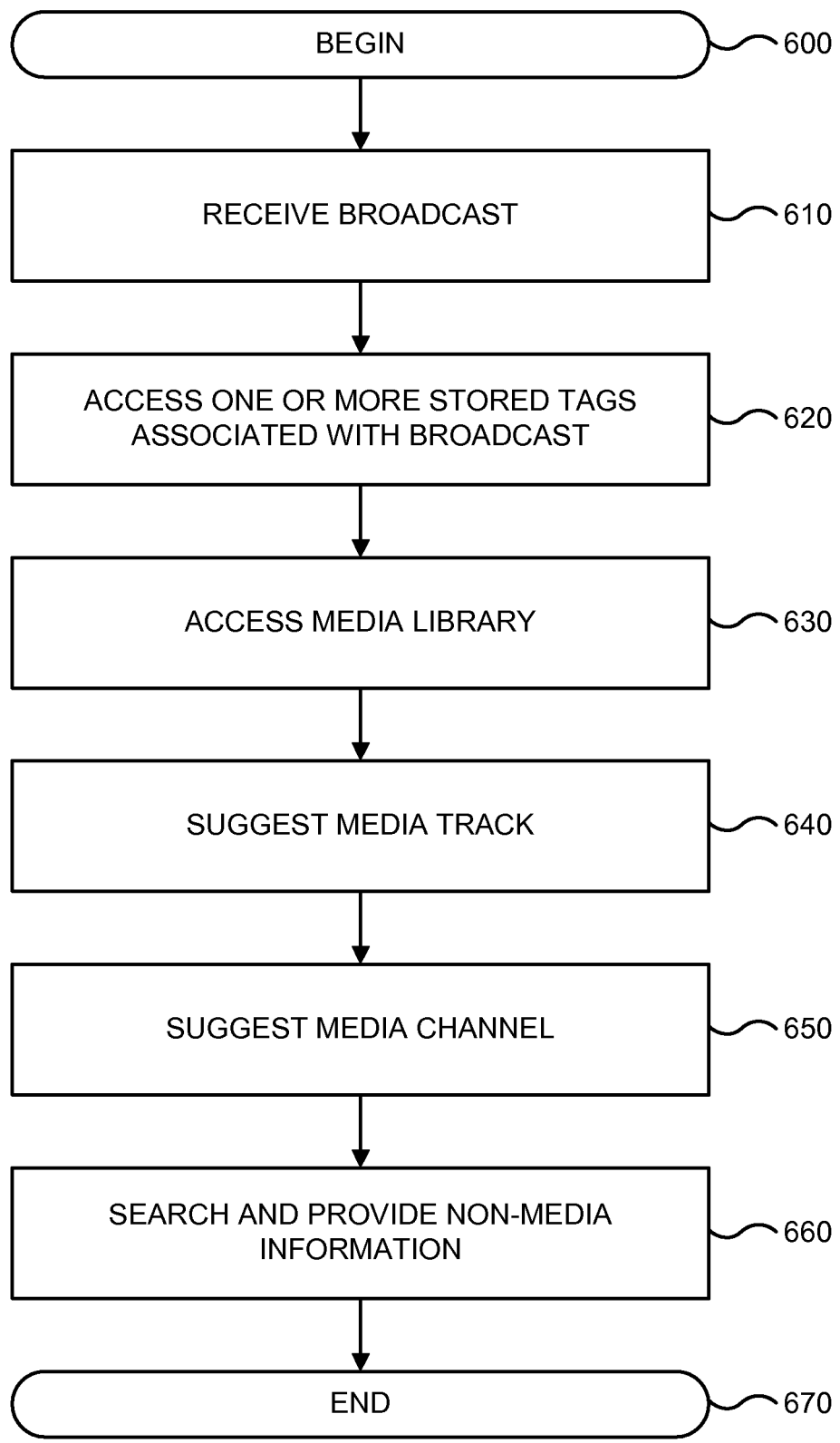
FIG. 6 illustrates a flowchart that obtains and suggests data to the user in accordance with one embodiment of the present invention.

FIG. 6 illustrates a flowchart that obtains and suggests data to the user in accordance with one embodiment of the present invention. FIG. 6 begins in step 600.

In step 610, PMD 102 receives a broadcast. For this example, PMD 102 includes a GPS sensor and receives a GPS signal from the GPS sensor. In step 620, PMD 102 accesses one or more tags stored in memory of PMD 102 based on the broadcast of the GPS signal). In step 630, PMD 102 accesses a user's media library stored in memory of PMD 102 based on the GPS signal.

In step 640, PMD 102 suggests one or more media tracks to the user based on the GPS signal, the one or more tags, and/or the user's media library. For example, PMD 102 may perform a tag-based search. In a tag-based search, PMD 102 may search for and identify other information related to the user's tags (e.g., media tags, location tags, advertisement tags, and the like). The other information may already reside in the user's device or may be obtained from an external source (e.g., the Internet, media broadcasts, etc.). In step 650, PMD 102 suggests one or more media channels to the user based on the GPS signal, the one or more tags, and/or the user's media library. Based on the GPS signal and, in some cases, the user's tags and media library, PMD 102 may search for local media broadcasts.

In step 660, PMD 102 searches for and provides non-media information that the user may be interested in. For example, PMD 102 may use the GPS signal obtained in step 610, the user's tags accessed in step 615, and/or the user's media library accessed in step 620 to search for and provide the user with event venue information (e.g., directions to the event venue, an opportunity to buy tickets to see a favorite band perform live in the local area, etc.), and the like. As another example, PMD 102 may search for and provide the user with the name of and directions to a local store where the user can purchase media (e.g., CD, DVD, paraphernalia, etc.) related to a tagged media track.

In alternative embodiments of the present invention that cannot obtain a GPS signal in step 610, or the GPS data is not used, PMD 102 may still search for and provide the user non-media information, suggest media tracks, and/or suggest media channels related to the data obtained in steps 620 and 630. For example, PMD 102 may access media tags and a content library stored in memory of the user's media device(s) in response to receiving a user selection of an artist, song title, genre, number of media tracks in a category of media (such as, e.g., artist, genre, etc.), frequency new media tracks are added to a category of media, etc.

In some embodiments, PMD 102 suggests media tracks or media channels based on a bid-based arrangement for ranking display of media tracks and/or media channels in accordance with an embodiment of the invention. In a bid-based arrangement, channel providers may submit bids (e.g., open bids or closed bids) to preferentially rank their respective channels against other channel providers. For example, the more a particular channel provider bids, the higher its channel may appear in a ranked list of channel providers. Bids may be accepted every predetermined time interval or at anytime.

In various embodiments, PMD 102 may upload tags to a central location along with tags accepted from multiple other media devices which determines the most tagged media and/or channels of media. A central server may accept tags from a media device using any means for accepting data. For example, the central server may accept tags via the Internet, a cellular telephone call, a wireless link, etc. The central server may request the tags and/or be configured to automatically receive tags that are provided by one or more media devices.

In one example, a central server generates a top tagged media chart. The central server may identify the most tagged media items (e.g., songs, movies, music videos, news items, ebooks, locations, products, ads, etc.) output the identified media in user-accessible form as a top tagged media chart. The top tagged media chart can be audio, video and/or text and include the most tagged media items among all users or a predefined set of users.

In addition to searching for programs that are related to the data obtained in steps 620 and 630, PMD 102 may exclude media and non-media information related to various user-defined values and/or any of the information obtained in steps 620 and 630. The exclusion may be, for example, a temporary exclusion that only excludes the media or non-media information while a particular characteristic or characteristics are associated with the media or non-media information. For example, the user can configure PMD 102 to exclude media channels that are currently on a commercial break. As such, PMD 102 may temporarily exclude, at any given time, from the search results channels of programming based on the programming that is currently being provided on the channel. As another example, when a radio station broadcasts different genres of broadcasts (e.g., songs, talk show, etc.) at different times throughout the day, PMD 102 may be configured by the user to only include the radio station's channel in the search when a certain genre (e.g., talk show) is being broadcast by the radio station.

Social networks are another example of non-media information that may be suggested by PMD 102 in step 660. For example, the media device may suggest a social network, such as a website related to the data obtained in steps 620 and 630, to the user. The social network may have a theme (e.g., an artist's fan club, a particular town's running club, etc.) that is related to the user-related data PMD 102 obtains. The social network may also be, for example, a website blog, a chat room including other people's user devices that are in the local area that have users with similar interests (e.g., based on similar tags, libraries, etc.), etc. PMD 102 may also use the social networks to suggest other media content and/or non-media information to the user.

Location Tagging

Figure 7:
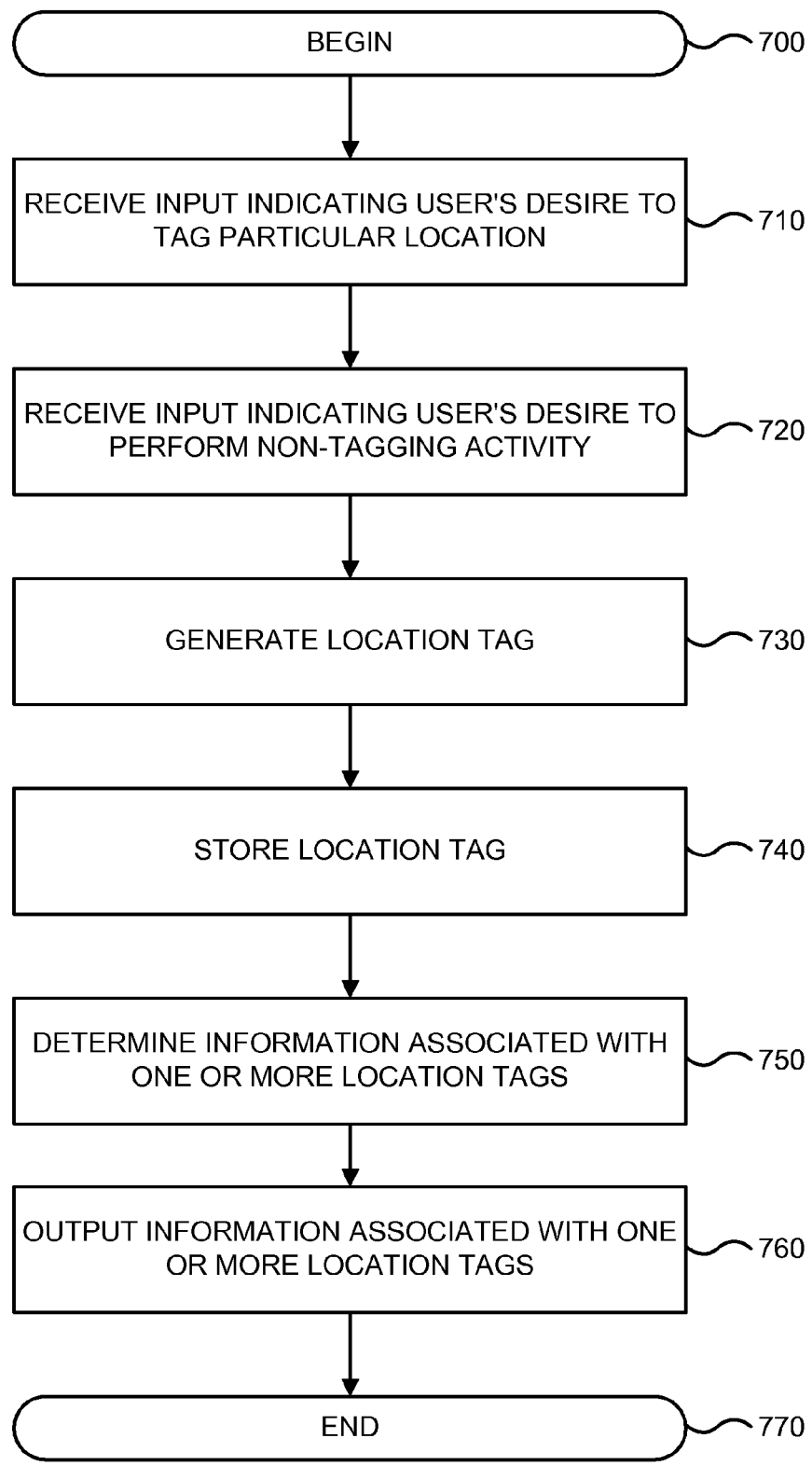
FIG. 7 illustrates a flowchart of a method for tagging a physical location in accordance with one embodiment of the present invention.

FIG. 7 illustrates a flowchart of a method for tagging a physical location in accordance with one embodiment of the present invention. FIG. 7 begins in step 700.

In step 710, PMD 102 accepts a user input indicative of the user's desire to tag a particular location. The user can, for example, instruct PMD 102 to tag PMD 102's current location provided by a GPS device, a beacon, cell towers, WiFi hotspots, and the like.

In step 720, PMD 102 accepts a user input indicative of the user's desire to perform a non-tagging activity. The non-tagging activity is preferably an activity that is associated with one or more user-initiated tagging activities. As discussed previously, tagging activities include but are not limit to tagging the physical location of PMD 102 in step 720, tagging the current time (not pictured), tagging media, and the like. Some examples of non-tagging activities are, for example, downloading tagged data for later annotation, creating a map based on tagged data, associating tagged data with other data (e.g., digital pictures), calculating miles traveled for reimbursement from a business, and the like.

In step 730, PMD 102 generates a location tag. The location tag may be generated when PMD 102 obtains a GPS signal. In other embodiments, the location tag may be generated based on information that is downloaded from one or more other data sources, such as, for example, cellular telephone towers, etc. In step 740, PMD stores the location tag.

In step 750, information associated with one or more location tags is determined. For example, PMD 102 may include software and/or hardware elements configured to use the one or more location tags to execute the non-tagging activity indicated in step 720. For example, the location tag can be downloaded for later annotation, used to plot on a map a route that the user traveled, associate a digital picture (which, in some instances may be taken by PMD 102) with the physical location of where the pictures were taken, calculate the number of miles the user traveled for reimbursement purposes, retrieve advertisements related to products or services offered by an organization residing at the tagged location, and the like.

In some embodiments, PMD 102 may also use the location tag to obtain additional information that is unrelated to step 720. In these other embodiments, step 720 may be omitted from the process or disregarded by the user. For example, PMD 102 may use the location tag to determine whether the corresponding location is a particular type of commercial establishment, tourist haunt, historical site, or other area of potential interest to the user. To determine what may be of potential interest to the user, PMD 102 may access other data and/or user profile(s) associated with the user.

In step 760, the information determined or obtained in step 750 is outputted in user-accessible form. Step 760 may include presenting the information on a display screen, uploading the information to a server, storing the information locally on PMD 102, storing the information remotely on another device, and the like. FIG. 7 ends in step 770.

In an alternative embodiment, the present invention can automatically generate a location tag responsive to non-tagging activities unrelated to user-initiated tagging activities. For example, the non-tagging activities can be indicative of a series of fitness activities performed by the user. When the user performs each of the fitness activities, the present invention can automatically generate and store a location tag. The user then can access the location tags after the workout and, for example, analyze the workout and the fitness activities performed based on the locations indicated by the location tags. To determine that a user has performed a non-tagging activity, PMD 102 may accept user input indicative thereof, accept signals generated by PMD 102's components (e.g., an accelerometer, proximity sensor, wireless receiver, etc.), accept signals generated by remote devices (e.g., cellular telephone providers, GPS satellites, automobile, etc.), and/or accept signals generated by one or more other sensors/tracking devices.

Advertisement Tagging

Figure 8:
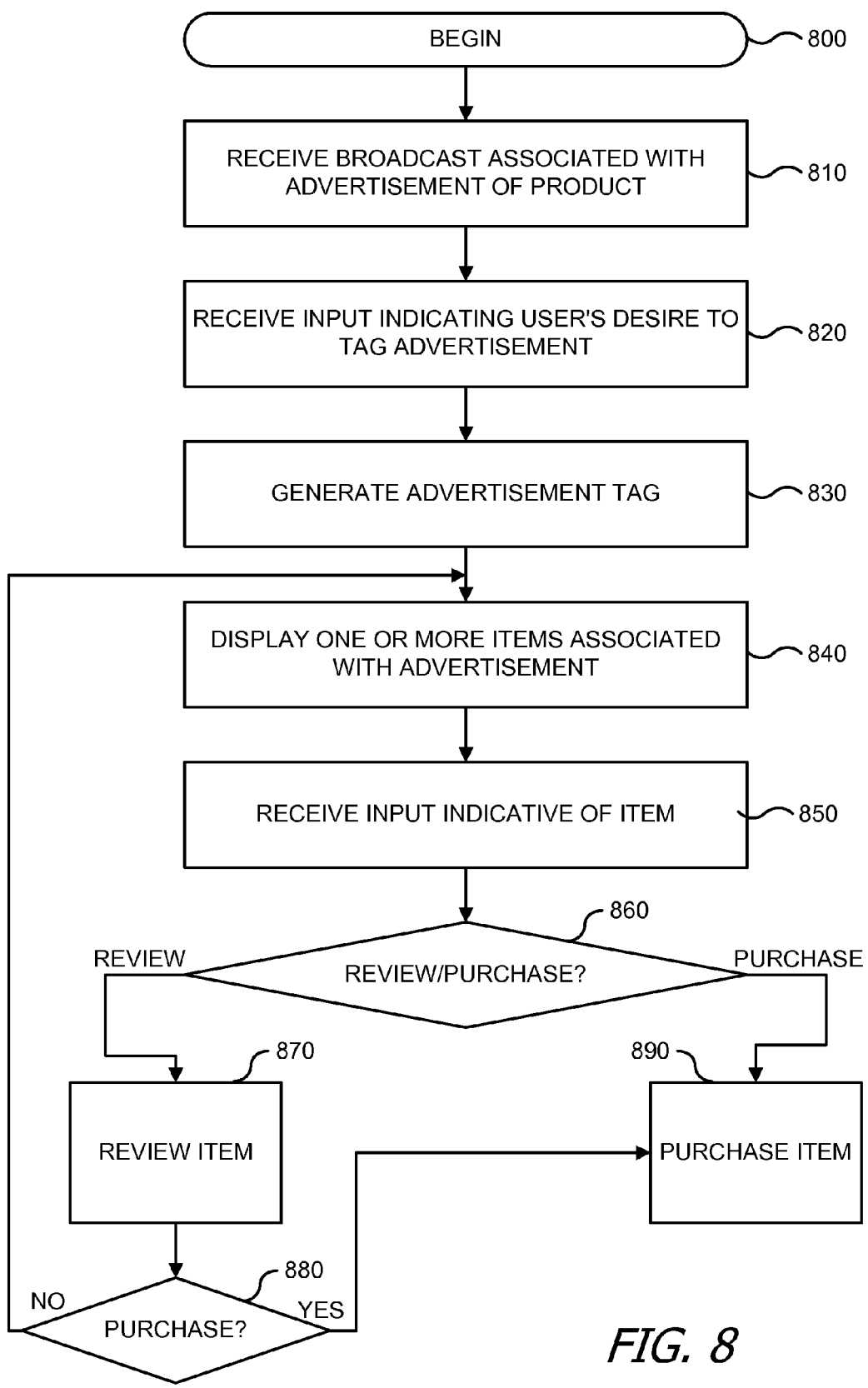
FIG. 8 illustrates a flowchart associated with generating and utilizing advertisement tags in accordance with one embodiment of the present invention.

FIG. 8 illustrates a flowchart associated with generating and utilizing advertisement tags in accordance with one embodiment of the present invention. FIG. 8 begins in step 800.

In step 810, PMD 102 receives a broadcast associated with an advertisement of a product. A product may be a tangible or intangible good or a service. In step 820, PMD 102 receives input indicating a user's desire to tag the advertisement. PMD 102 may accept a user input while PMD is receiving or providing the advertisement to the user. The user input can indicate to the media device the user's desire to tag the advertisement and/or the user's interest in the content being advertised.

In step 830, an advertisement tag is generated. In step 840, one or more items associated with the advertisement are displayed. When multiple items are associated with the advertisement, a list of the items may be displayed in step 840. The list of items may include, for example, one or more products, one or more background songs, one or more objects used in the advertisement (e.g., a particular car can be used to advertise automobile insurance, etc.), a celebrity shown or associated with the advertisement (e.g., a known spokes model of the product or speaker in a radio advertisement), etc. When only one item is associated with the advertisement, PMD 102 may present a list that includes the only item or PMD 102 may omit step 840 from the process.

In step 850, PMD 102 receives input indicative of one or more of the listed items. When the items are selected, the user may be provided with an opportunity to review the selected items or tagged advertisement or immediately purchase the selected item(s) or tagged advertisement. If user elects to review in step 860, the process can move to step 870, which allows the user to review the selected items or tagged advertisement. After the review is complete, the user may be presented with an opportunity to purchase the items or advertisement in step 880. If the user declines to purchase, the process can revert back to step 840. If the user accepts to purchase in step 860 or in step 880, the process can proceed to step 890 to purchase the item. In step 890, the user can purchase the selected items or tagged advertisement.

In one embodiment, a user may set PMD 102 to a purchase mode or a review mode. In purchase mode, PMD 102 can automatically purchase an item in a tagged advertisement or a tagged media track. In review mode, PMD 102 can automatically permit the user to review the item(s) associated with the tag(s) before the user decides whether to purchase any of the item(s) associated with the tag(s).

Figure 9:
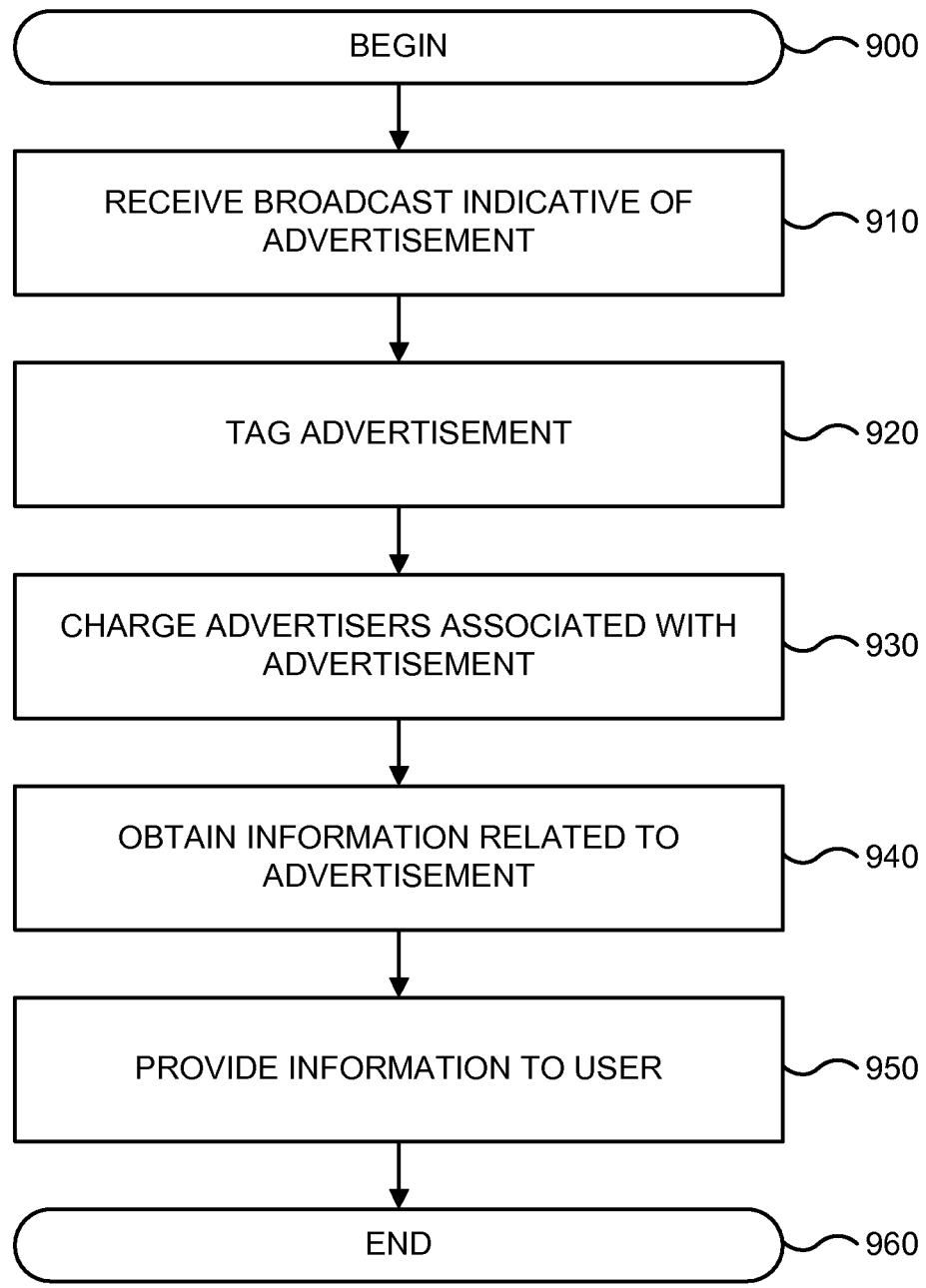
FIG. 9 illustrates a flowchart for tagging advertisements in accordance with an embodiment of the present invention.

FIG. 9 illustrates a flowchart for tagging advertisements in accordance with an embodiment of the present invention. FIG. 9 begins in step 900.

In step 910, PMD 102 receives a broadcast indicative of an advertisement. In step 920, the advertisement is tagged (and an advertisement tag is generated). In step 930, one or more advertisers associated with the tagged advertisement are charged. In step 940, information related to the tagged advertisement is obtained and, in step 950, provided to the user.

The information may be provided immediately to give the user with instant access to the advertiser. For example, the user may be provided with a number to call the advertiser or provided with a website URL to access the advertiser's website. The information can also be used to create personalized advertisements when the user accesses an virtual store (such as Apple Inc.'s iTunes™ Store) or enters a physical store associated with the tagged advertisement. For example, the user may tag an advertisement for a artist's CD and, when PMD 102 determines that the user has entered a virtual music store or brick and mortar record store, the tagged advertisement can be used to present the user with a personalized advertisement for the artist's CD. As another example, the user can tag a radio advertisement for an automobile and, when PMD 102 determines that the user is online or near a car dealership, the tagged advertisement can be used to present the user with a personalized advertisement or other information related to the automobile.

In some embodiments, free downloads and/or coupons may be provided to the user based on tagged advertisements. For example, certain advertisements may contain information to link the user to a site that automatically downloads a media asset and/or coupon when selected. FIG. 9 ends in step 960.

Tag Based User Profiles or Preference Lists

Figure 10:
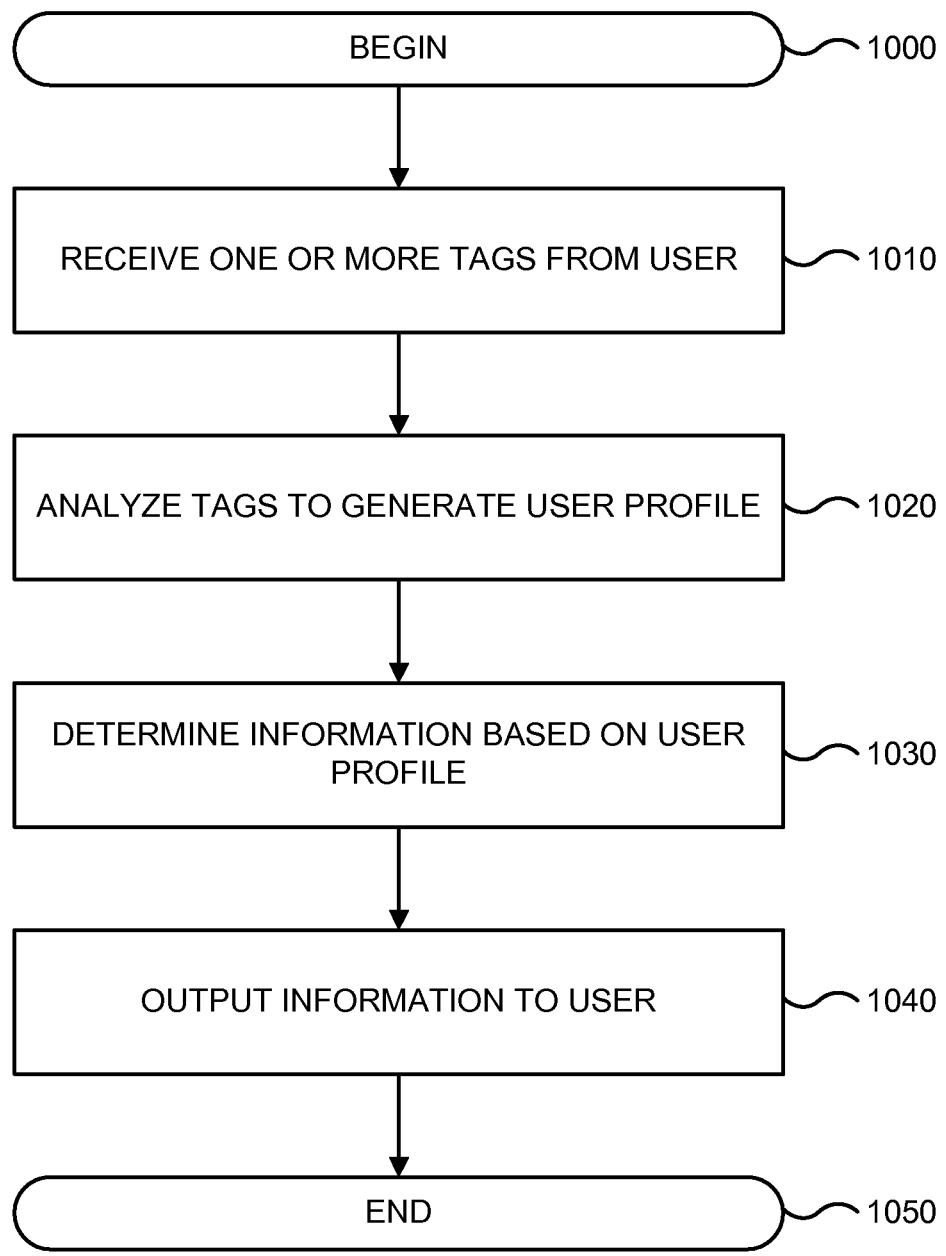
FIG. 10 illustrates a flowchart for customizing or marketing content provided to users based on tags in accordance with embodiments of the invention.

FIG. 10 illustrates a flowchart for customizing or marketing content provided to users based on tags in accordance with embodiments of the invention. FIG. 10 begins in step 1000.

In step 1010, one or more tags are received from a user. For example, the one more tags may be received from a user media device (e.g., PMD 102). The received tags may include data tags, media tags, location tags, advertisement tags, and the like. These received tags may be analyzed, for example, by a central server system that generates a user profile (or preference list) based on the received tags, in step 1020. In step 1030, information and/or content that may capture the interest of a particular user is determined or predicted based on the user's profile generated from the user's tags.

In step 1040, the determined or customized information and/or content is output or provided to the user. The determined or customized information can include, for example, audio, video, ebooks, literature, guides, discounts, products or services, and the like. FIG. 10 ends in step 1050.

In some embodiments, a media device may use the contents of a tag to generate a user-accessible database (e.g., a customized web page) with links to purchase or view more information about the contents of the tag. For example, the database can provide links and information related to any of the media items, products, and/or people associated with a tagged advertisement, including recommendations of products, services, and/or media that may be of interest to the user based on the tagged advertisement. The database also can provide links and information related to the location and/or points of interest at or near a tagged location, again including recommendations of products, services, and/or media that may be of interest to the user based on the tagged location. The database also can provide recommendations, display media assets, and/or provide links thereto based on tagged media, a user's personal media library, or other suitable factors such the currently playing media asset. Recommendations can include recommendations of products, services, and/or media that may be of interest to the user based on, for example, the tagged media and/or the user's personal media library. The recommended or displayed media assets can include media of different genres. For example, based on one or more tagged songs, an electronic program guide of the present invention also can recommend other songs related thereto, television shows or movies in which the song is played, etc.

Figure 11:
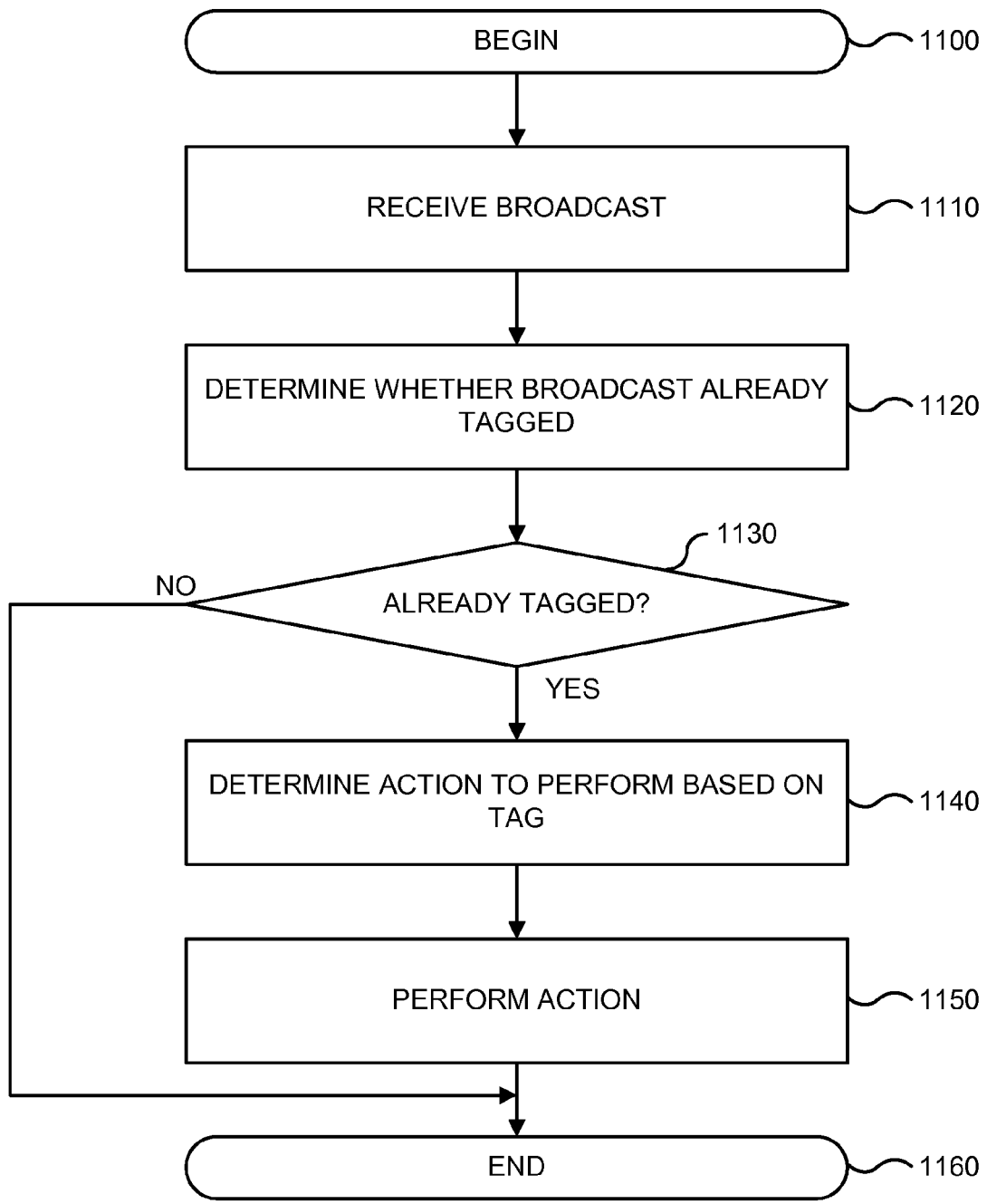
FIG. 11 illustrates a flowchart for recognizing that assets have already been tagged in accordance with embodiments of the invention.

FIG. 11 illustrates a flowchart for recognizing that assets have already been tagged in accordance with embodiments of the invention. FIG. 11 begins in step 1100.

In step 1110, a broadcast is received. In step 1120, a determination is made whether the broadcast has already been tagged. For example, PMD 102 may search through previously created tags to find a match with the current broadcast. In another example, each tag may include a unique hash. A collision between the hash values of two tags may indicate that the broadcast has already been tagged.

If the broadcast has already been tagged in step 1130, an action to be performed is determined based on a previous tag in step 1140. Some examples of actions are to overwrite the previous tag, update the tag, generate a notification, prompt the user for more information, prompt the user to purchase the tagged item, and the like. In step 1150, the action is performed. FIG. 11 ends in step 1160.

Figure 12:
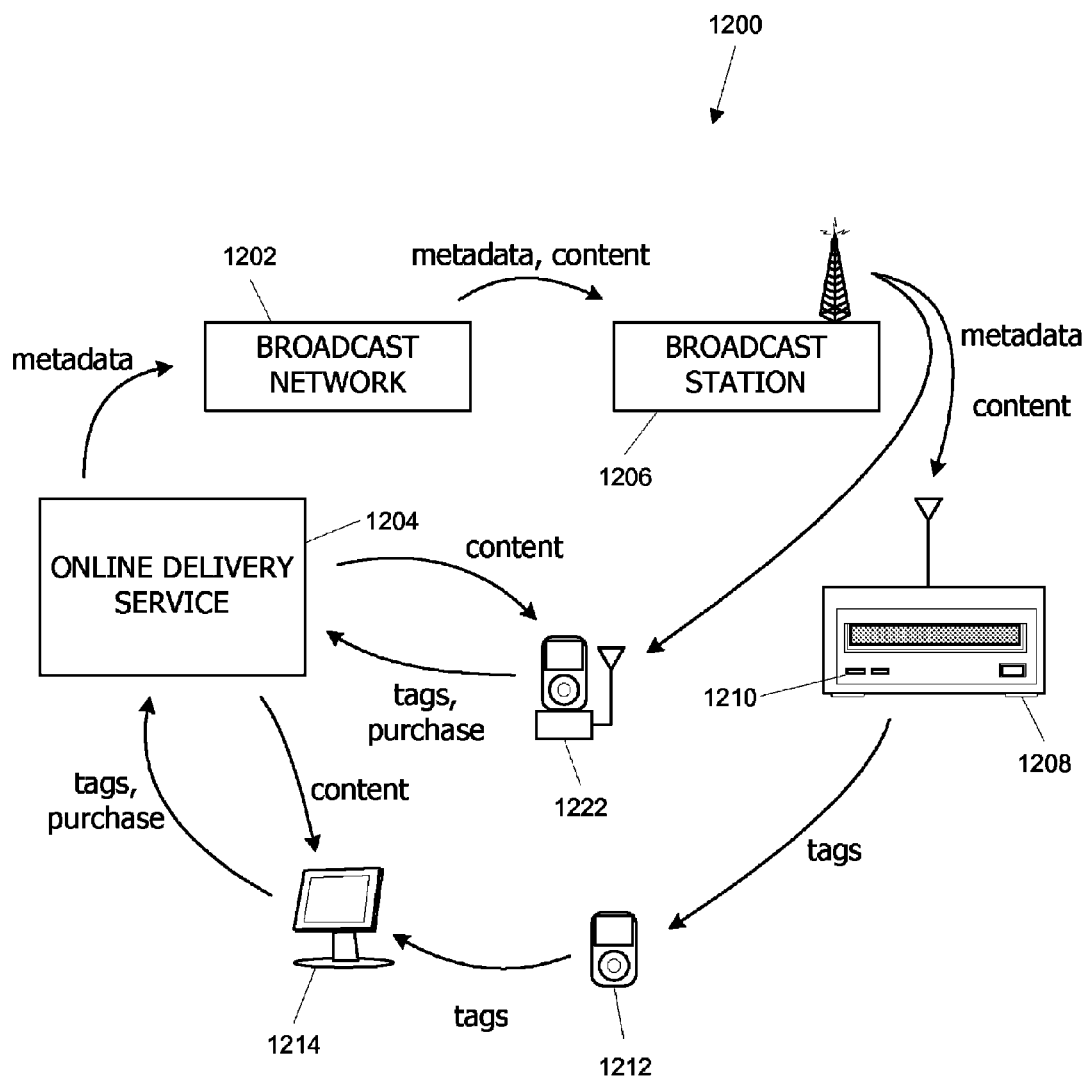
FIG. 12 is a diagram of an information communication system incorporating tagging features according to an embodiment of the present invention.

FIG. 12 is a diagram of information communication system 1200 incorporating tagging features according to an embodiment of the present invention. In system 1200, broadcast network 1202 can be an affiliate of online delivery service 1204 (which can be an Internet-based service such as iTunes™). Delivery service 1204 can provide affiliated broadcast network 1202 with metadata that can be embedded in broadcast signals.

The metadata may include per-track metadata (e.g., an identifier of the track that maps to the internal identifiers used by delivery service 1200) and track-independent metadata, such as an identifier that identifies broadcast network 1202 as an affiliate of delivery service 1204. Broadcast network 1202 can provide this metadata, along with content (e.g., music, movies, location information, advertisements, etc.) to its member broadcast stations 1206. In turn, member broadcast stations 1206 can broadcast the content along with the metadata, e.g., using FM/HD/Satellite radio technology, VHF/UHF/Cable/Fiber/Satellite TV technology, GPS technology, Cellular technology, WiFi/WiMAX/Bluetooth technology, and the like.

A user can operate receiver 1208 to receive the content and metadata from broadcast station 1206. Receiver 1208 can be, e.g., an embodiment of accessory 104 or accessory 104 described above. Thus, receiver 1208 can extract the metadata from a received broadcast and create tags for any or all of the music, movies, images, locations, advertisements, products, goods, and services indicated by the broadcast, e.g., in response to user operation of a control button 1210.

Receiver 1208 can be configured to communicate the tags it creates to PMD 1212 at such times as PMD 1212 is connected to receiver 1208, (e.g., by writing one or more tag files to PMD 1212). PMD 1212 can be, e.g., an embodiment of PMD 102 or PMD 102 described above. In some embodiments, PMD 1212 may be equipped with hardware and/or software based security features so that only authorized receivers 1208 are capable of writing data to PMD 1212. For example, the command protocol may include authentication commands by which PMD 1212 can determine whether receiver 1208 is an authorized receiver, and PMD 1212 may reject any or all of the storage lingo commands unless receiver 1208 is properly authenticated. Such security measures can protect PMD 1212 and data stored thereon from malicious tampering or accidental damage. In addition, PMD 1212 can sign each tag file created by receiver 1208, e.g., using conventional digital signature techniques, thus protecting the integrity of the tag data provided by receiver 1208. For example, in embodiments where each tag is stored in a separate file, PMD 1212 can generate the digital signature before writing the tag file; this can help to ensure that the stored tag file contains the tag as received by PMD 1212.

After receiving the user's tags from receiver 1208, PMD 1212 can be connected to host computer 1214. Host computer 1214 can read the stored tags from PMD 1212 and produce a list (e.g., a item list or playlist) of the user's tagged content. Host computer 1214 can also use the digital signature on the tag files to verify that the tags originated from an authenticated receiver and/or as a check on data integrity.

The transfer of tags from receiver 1208 to PMD 1212 and the transfer of tags from PMD 1212 to host computer 1214 can be fully automated; that is, receiver 1208 can automatically detect when PMD 1212 is connected thereto and can automatically transfers the tags (including any accumulated tags) whenever a connection is detected. Similarly, PMD 1212 can automatically transfer stored tags to host computer 1214 whenever PMD 1212 synchronizes with host computer 1214. Thus, the user is able to conveniently and almost effortlessly collect and review tags for broadcast tracks.

Host computer 1214 can be further connected to communicate with delivery service 1204 (e.g., via the Internet). For example, host computer 1214 can provide the tag information to delivery service 1204, allowing delivery service 1204 to offer the user an opportunity to purchase any or all of the tagged content. If the user chooses to buy tagged content, delivery service 1204 can deliver the electronic content to host computer 1214 (e.g., via the Internet). Host computer 1214 can further deliver the track (not explicitly shown) to PMD 1212. Delivery service 1204 can further direct the user to an electronic store front to consummate the purchase and shipping of physical goods and/or services.

System 1200 can also include another PMD 1222 capable of receiving broadcast signals including metadata and content from broadcast station 1206. For example, PMD 1222 can be configured with a portable receiver accessory as shown in FIG. 1E. PMD 1222 can also be configured to communicate wirelessly with online delivery service 1204. For example, PMD 1222 can be configured with WiFi or other wireless technologies usable to communicate with a wireless access point connected to the Internet, and delivery service 1204 can also be connected to the Internet.

PMD 1222 can communicate tags and purchase requests to delivery service 1204 in real time (e.g., as the user operates a control to indicate interest in tagging and/or purchasing a track), and a user can obtain information about content and/or purchase the content without waiting to synchronize with a host computer system.

Thus, a user of PMD 1212 or PMD 1222 is provided with options for obtaining music, TV programming, maps, guides, books, coupons, and other content in which the user has indicated an interest.

A proprietor of delivery service 1204 can generate revenue by selling content, including tagged content. While tagged content can be identified in a variety of ways (e.g., by reference to broadcasters' playlists, analysis of sound samples, or matching of metadata such as track name and artist name to track information stored in a database of delivery service 1204), more reliable identification can be achieved if the tag includes a unique identifier used by delivery service 1204. As incentive to broadcasters and/or other entities involved in collecting tags to include these unique identifiers in the metadata and tags extracted therefrom, the proprietor of delivery service 1204 can offer incentives.

For example, as noted above, the tag metadata can include an affiliate identifier assigned to a particular broadcaster (e.g., broadcast station 1206). The broadcaster can include the affiliate identifier along with the unique identifier in metadata broadcast in association with content. When a track is tagged, the tag information returned to delivery service 1204 can include the affiliate identifier. If the user purchases a tagged track, delivery service 1204 can use the affiliate identifier to determine which broadcaster was the source of the tagged broadcast and provide an appropriate reward, e.g., a portion of the purchase price of the content, good, or service.

An affiliate rewards program can also be extended to other points in system 1200. For example, metadata associated with a broadcasts can identify a creator or distributor of the content (e.g., broadcast network 1202), and this identification can be the basis for making rewards payments to creators or distributors whose content, goods, or services are purchased. As another example, an accessory that facilitates tagging (e.g., accessory 1208 or 1222) can include in the tag information identifying the manufacturer of the accessory. This information can also be propagated to delivery service 1204 and used to provide rewards to makers of accessories that are used for tagging activities that result in a purchase.

Media asset delivery service 1204 may also provide access to other information associated with tagged content. For instance, the user may be able to preview a portion of a tagged audio/video/image content, access a free version of the track (e.g., with embedded advertising content or reduced quality), access direction information, maps, restaurant reviews, guides, menus, schedules/timetables, or the like.

It will be appreciated that system 1200 is illustrative and that variations and modifications are possible. In general, system 1200 can include any number of broadcasters broadcasting various types of media, and any number of media receivers and media devices can be capable of receiving such broadcasts and/or communicating with a media delivery service to obtain tagged media assets and/or associated information.

Further Embodiments

While the invention has been described with respect to specific embodiments, one skilled in the art will recognize that numerous modifications are possible. For instance, the commands and event sequences used to store tags might be different from the particular commands and event sequences described herein. In some embodiments, additional commands, such as commands allowing the accessory to read back data written to an open file, could be added. The sequences of commands used to store tags in tag files might be varied.

In addition, tags can be applied to any type of broadcast including but not limited to musical tracks, spoken-word tracks, video broadcasts, podcasts, advertisements, still images, and so on. Any identifying information associated with broadcast content may be included in a tag for that content, and tags may be stored in any format desired.

The protocols and file formats described herein can be used with a wide range of PMDs and/or accessories; for example, the PMD could have additional functionality such as the ability to make and receive telephone calls, voice recorder capability, personal information management capability (e.g., calendar, contacts list, e-mail, etc.). Further, in some embodiments, some or all of the functionality described in connection with an accessory could also be part of a PMD. For example, the PMD might be configured to extract tag information from broadcast content, or a receiver could be packaged with a PMD (e.g., inside the same housing) and sold as a unit.

In embodiments where the PMD includes an integrated receiver (e.g., as shown in FIG. 1F), the PMD can extract the tag information from the received broadcast. In embodiments where the PMD is connected to a network, the PMD can communicate tag information to a media asset delivery service immediately upon receipt thereof. Thus, in some embodiments, as a user is listening to a broadcast track that is taggable, the user can operate a user input control of the PMD to store the tag information and/or immediately purchase the track. To store tag information, the PMD can write the information to a tag file, e.g., as described above. To purchase the track, the PMD can forward a purchase request including the tag information to the media asset delivery service via the network; the track can then be downloaded from the media asset delivery service to the PMD via the network.

Embodiments of the present invention can be applied to a wide variety of media types, including music, spoken word (e.g., audio books, lectures), video (e.g., television, movies), still images, and others. Any broadcast medium may be used to transmit taggable media content, and any type or combination of asset-identifying information can be included in a tag.

Embodiments of the present invention can be realized using any combination of dedicated components and/or programmable processors and/or other programmable devices. While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible device or provided separately from other devices (e.g., via Internet download). Program code may also be encoded and transmitted using carrier signals adapted for transmission via wired, optical, and/or wireless networks conforming to a variety of protocols, including the Internet.

What is claimed is:

1. A method for tagging locations, the method comprising:
    receiving, by a media device, a broadcast indicative of a location;
    determining, by the media device, whether the location is to be tagged based on the received broadcast;
    extracting, by the media device, identifying information for the location from the broadcast;
    obtaining, by the media device, a metadata item for the location from a source other than the broadcast, wherein the metadata item includes at least a longitude and a latitude associated with the location;
    generating, by the media device, a tag for the location, the tag comprising the identifying information for the location and the metadata item; and
    using the tag to access one or more location-based services.

2. The method of claim 1 wherein determining whether the location is to be tagged includes receiving an instruction to tag the location.

3. The method of claim 1 wherein the tag includes a plurality of metadata items descriptive of the location.

4. The method of claim 3 wherein the plurality of metadata items descriptive of the location includes one or more items selected from a group consisting of a latitude, a longitude, an altitude, an address, a city, a state, a postal code, and a country.

5. The method of claim 1 wherein the tag includes a plurality of metadata items descriptive of a broadcaster of the location.

6. The method of claim 5 wherein the plurality of metadata items descriptive of the broadcaster includes one or more items selected from a group consisting of an identifier associated with the broadcaster, an area associated with the broadcaster, a network or group with which the broadcaster is affiliated, and a uniform resource locator (URL) associated with the broadcaster.

7. The method of claim 1 wherein receiving the broadcast includes:
    receiving a plurality of metadata fields associated with the location.

8. The method of claim 7 wherein generating the tag includes:
    populating an XML dictionary with a plurality of key-value pairs, each key-value pair corresponding to one of the plurality of metadata fields.

9. The method of claim 1 where the tag includes a representation of the location.

10. The method of claim 1 wherein a source of the received broadcast data is a location broadcasting station and the source of the metadata item is a data network.

11. The method of claim 10 wherein the location broadcasting station is the Global Positioning System.

12. The method of claim 10 wherein the location broadcasting station is a WiFi hotspot.

13. The method of claim 1 wherein the location-based services comprise one of: directions, reviews, guides, menus, advertisements, coupons, media tracks, media channels, and a uniform resource locator (URL) associated with a social network.

14. The method of claim 1 further comprising:
    displaying information about the location.

15. The method of claim 14 wherein displaying the information about the location includes displaying the information on a display device of the media device.

16. The method of claim 14 wherein determining whether the location is to be tagged includes:
    receiving, while the information about the location is displayed, a signal indicative of a request from a user to generate a tag.

17. The method of claim 1 further comprising:
    receiving another broadcast indicative of the location;
    determining, based on the other broadcast, whether the location has previously been tagged; and
    performing an action based on whether the location has previously been tagged.

18. The method of claim 17 wherein performing an action comprises searching for a media channel based on the location.

19. The method of claim 17 wherein performing an action comprises searching for an advertisement based on the location.

20. The method of claim 17 wherein performing an action comprises searching for non-media content based on the location.

21. The method of claim 1 wherein using the tag to access one or more location based services comprises finding an advertisement based on the location.

22. The method of claim 1 wherein using the tag to access one or more location based services comprises searching for media channels based on the location.

23. The method of claim 1 wherein the source other than the broadcast is a database.

24. The method of claim 23 wherein the database is external to the media device.

25. An accessory for use with a portable media device ("PMD"), the accessory comprising:
    a receiver component configured to receive a broadcast indicative of a location;
    a tag extraction engine configured to:
        extract identifying information for the location from the broadcast;
        obtain a metadata item for the location from a source other than the broadcast; and
        capture a tag comprising the identifying information for the location and the metadata item; and
    an interface configured to communicate the captured tag from the tag extraction engine to a PMD, wherein the PMD is configured to use the tag to access a location-based service.

26. The accessory of claim 25 further comprising:
    a user input component configured to receive a user input indicating that the location should be tagged; and
    wherein the tag extraction engine is further configured to capture the tag comprising the identifying information for the location, in response to the user input.

27. The accessory of claim 25 wherein the tag extraction engine is further configured to capture, as part of the tag, metadata received with the broadcast indicative of the location.

28. A non-transitory computer readable medium configured to store a set of instructions which when executed by a set of processors cause the processors to tag locations, the computer readable medium comprising:
  code for receiving a broadcast indicative of a location;
  code for determining whether the location is to be tagged;
  code for extracting identifying information for the location from the broadcast;
  code for obtaining, a metadata item for the location from a source other than the broadcast;
  code for generating a tag for the location, the tag comprising the identifying information for the location and the metadata item; and
  code for instructing a portable media device to store the tag in a storage medium of the portable media device, wherein the tag is used to access a location-based service.

29. A method for tagging a location, the method comprising:
  receiving, by a media device, a broadcast indicative of a location;
  determining, by the media device, whether the location is to be tagged;
  extracting, by the media device, identifying information for the location from the broadcast;
  obtaining, by the media device, a metadata item for the location from a source other than the broadcast;
  generating, by the media device, a tag for the location, the tag comprising the identifying information for the location and the metadata item;
  retrieving, by the media device, stored information indicative of a user preference; and
  based on the stored information and the tag, providing, by the media device, a location-based service to a user.

30. The method of claim 29 wherein providing the location-based service includes:
  identifying, by the media device, an advertisement based on the stored information and the tag; and
  presenting, by the media device, the advertisement to the user.

31. The method of claim 29 wherein providing the location-based service includes:
  identifying, by the media device, a media channel based on the stored information and the tag; and
  presenting, by the media device, a recommendation for the media channel to the user.

32. The method of claim 29 wherein providing the location-based service includes:
  identifying, by the media device, media content based on the stored information and the tag; and
  presenting, by the media device, the media content to the user.

33. A media device comprising:
  a processor; and
  a receiver coupled to the processor, wherein the receiver is configured to receive a broadcast indicative of a location; and
  wherein the processor is configured to:
    determine whether the location is to be tagged;
    extract identifying information for the location from the broadcast;
    obtain a metadata item for the location from a source other than the broadcast;
    generate a tag for the location, the tag comprising the identifying information for the location and the metadata item;
    retrieve stored information indicative of a user preference; and
    based on the stored information and the tag, provide a location-based service to a user.

34. The media device of claim 33 wherein the processor is further configured to:
  identify an advertisement based on the stored information and the tag; and
  present the advertisement to the user.

35. The media device of claim 33 wherein the processor is further configured to:
  identify a media channel based on the stored information and the tag; and
  present a recommendation for the media channel to the user.

36. The media device of claim 33 wherein the processor is further configured to:
  identify media content based on the stored information and the tag; and
  present the media content to the user.

* * * * *